US011908149B2

(12) United States Patent
Busey

(10) Patent No.: US 11,908,149 B2
(45) Date of Patent: Feb. 20, 2024

(54) PATTERN-TRIGGERED OBJECT MODIFICATION IN AUGMENTED REALITY SYSTEM

(71) Applicant: Andrew Thomas Busey, Austin, TX (US)

(72) Inventor: Andrew Thomas Busey, Austin, TX (US)

(*) Notice: Subject to any disclaimer, the term of this patent is extended or adjusted under 35 U.S.C. 154(b) by 437 days.

(21) Appl. No.: 17/068,340

(22) Filed: Oct. 12, 2020

(65) Prior Publication Data

US 2021/0110557 A1 Apr. 15, 2021

Related U.S. Application Data

(60) Provisional application No. 63/030,651, filed on May 27, 2020, provisional application No. 62/913,356, filed on Oct. 10, 2019.

(51) Int. Cl.
*G06T 7/564* (2017.01)
*G06N 3/08* (2023.01)
(Continued)

(52) U.S. Cl.
CPC .............. *G06T 7/564* (2017.01); *G06N 3/08* (2013.01); *G06T 7/521* (2017.01); *G06T 17/20* (2013.01);
(Continued)

(58) Field of Classification Search
CPC ............ G06N 3/08; G06N 3/02; G06N 20/00; G06N 3/0454; G06T 2207/20081;
(Continued)

(56) References Cited

U.S. PATENT DOCUMENTS 8,803,914 B2 8/2014 Chen et al.
8,814,048 B2 8/2014 Taylor
(Continued)

FOREIGN PATENT DOCUMENTS

CN 109978930 A * 7/2019
WO WO-2014020320 A1 * 2/2014 ......... A63F 13/5378

OTHER PUBLICATIONS

Yang et al. "Stereo Image Point Cloud and LiDAR Point Cloud Fusion for the 3D Street Mapping." Annual Conference of the American Society of Photogrammetry and Remote Sensing (IGTF 2017—Imaging & Geospatial Technology Forum 2017), Baltimore, Maryland, (Year: 2017).*
(Continued)

Primary Examiner — Sumati Lefkowitz
Assistant Examiner — Michael Adam Shariff
(74) Attorney, Agent, or Firm — PILLSBURY WINTHROP SHAW PITTMAN, LLP

(57) ABSTRACT

Provided is a system configured to obtain a set of images via a camera of the computing device, input the set of images into a neural network, and detect a target physical object with the neural network. The system may determine a contour of the target physical object and a first three-dimensional reconstruction of the target physical object. The system may generate a virtual representation and a virtual object based on attributes of the virtual representation, where a first attribute of the set of attributes includes the first three-dimensional reconstruction. The system may associate the virtual object with the virtual representation and displays the virtual object at pixel coordinates of a display that at least partially occlude at least part of the target physical object, where a position of the virtual object is computed based on the contour.

22 Claims, 6 Drawing Sheets

(51) Int. Cl.
  *G06T 19/00*   (2011.01)
  *G06T 7/521*   (2017.01)
  *G06T 17/20*   (2006.01)
(52) U.S. Cl.
  CPC .. *G06T 19/006* (2013.01); *G06T 2207/10028* (2013.01)
(58) Field of Classification Search
  CPC . G06T 2207/20084; G06T 7/50; G06T 7/529; G06T 7/55; G06T 7/564; G06T 7/521; G06T 7/40; G06T 7/543; G06T 17/00; G06T 17/20; G06T 2200/04; G06T 2200/08; G06T 17/05; G06T 17/30; G06T 2219/00; G06T 2219/20; G06T 19/00; G06T 19/003; G06T 19/006; G06T 19/20; G06T 2207/10028; G06T 7/00; G06T 7/70; G06T 7/73; G06T 7/75; G06T 7/80; G06T 2207/30244; G06T 2207/10016; G06V 10/40; G06V 10/70; G06V 10/82; G06V 10/454; G06V 20/20; G06V 10/46; G06V 10/44; G06V 10/462; G06F 3/011; G06F 3/04815; G06F 3/012; G02B 27/017; G02B 27/0101; G02B 2027/0138; G02B 27/0172; G02B 2027/0178
  See application file for complete search history.

(56) References Cited

U.S. PATENT DOCUMENTS

| | | | |
|---|---|---|---|
| 9,858,724 | B2 | 1/2018 | Friesen |
| 10,169,924 | B2 | 1/2019 | Rosenthal et al. |
| 10,242,031 | B2 * | 3/2019 | Jung .................. G06F 16/5838 |
| 10,621,779 | B1 * | 4/2020 | Topiwala .................. G06N 3/08 |
| 11,157,814 | B2 * | 10/2021 | Howard .................. G06N 3/082 |
| 2008/0266323 | A1 | 10/2008 | Biocca et al. |
| 2019/0096135 | A1 * | 3/2019 | Dal Mutto ........ G06F 18/24765 |
| 2020/0202195 | A1 * | 6/2020 | Patel ........................ G06F 7/485 |
| 2020/0312042 | A1 * | 10/2020 | Sardari ...................... G06T 7/50 |
| 2020/0388071 | A1 * | 12/2020 | Grabner .................. G06T 17/20 |
| 2021/0174103 | A1 * | 6/2021 | Schumacher ........... G06F 18/22 |

OTHER PUBLICATIONS

Yang et al. "Stereo Image Point Cloud and LiDAR Point Cloud Fusion for the 3D Street Mapping." Annual Conference of the American Society of Photogrammetry and Remote Sensing (IGTF 2017—Imaging & Geospatial Technology Forum 2017), Baltimore, Maryland, Mar. 2017 (Year: 2017).*
Li et al., "RIFT: Multi-modal Image Matching Based on Radiation-invariant Feature Transform," 2018, arXiv preprint arXiv:1804.09493.
Ranchordas et al., "Computer Vision and Computer Graphics: Theory and Applications," International Conference, VISIGRAPP 2008.
De Carvalho et al., "Literature review for 3D object classification/recognition," INCoD, 2017.
Mair et al., "Adaptive and Generic Corner Detection Based on the Accelerated Segment Test," In European conference on Computer vision (pp. 183-196). Sep. 2010, Springer, Berlin, Heidelberg.
Sandler et al., "MobileNetV2: Inverted Residuals and Linear Bottlenecks," In Proceedings of the IEEE conference on computer vision and pattern recognition (pp. 4510-4520), 2018.
"google-ar/arcore-android-sdk," https://github.com/google-ar/arcore-android-sdk/releases?after=v1.12.1 Aug. 5, 2019 (19 pages).
Bradley, Derek, "Augmented Reality on Cloth with Realistic Illumination," Apr. 2005, Ottawa-Carleton Institute for Comuter Science (89 pages).
Nield, David, "The Next iPhone Might Have a Time-of-Flight Sensor—but What the Heck Is That?," Aug. 2, 2019, https://gizmodo.com/the-next-iphone-might-have-a-time-of-flight-sensor-but-1836877866, pp. 1 to 11.
Potuck, Michael, "Apple unveils ARKit 3 with people occlusion, motion capture, multiple face tracking, and more," Jun. 3, 2019, https://9to5mac.com/2019/06/03/apple-arkit-3/, pp. 1 to 6.
Web Archive of Zappar.com/showcase, https://web.archive.org/web/20190718232222/https://www.zappar.com/showcase/, Jul. 18, 2019, pp. 1 to 3.
Web Archive of Curiscope.com, https://web.archive.org/web/20191005032315/https://www.curiscope.com/, pp. 1 to 8.
Web Archive of Californiatattoos.com, https://web.archive.org/web/20200930163553/https://californiatattoos.com/custom-promotional-products/augmented-reality/, Sep. 30, 2020, pp. 1 to 3.
Bradley, D. et al., "Augmented reality on cloth with realistic illumination," Machine Vision and Applications, Nov. 23, 2007, https://link.springer.com/article/10.1007/s00138-007-0108-9, pp. 1 to 8.
Web Archive of https://developers.google.com/ar, https://web.archive.org/web/20191006101253/https://developers.google.com/ar/, Oct. 6, 2019, pp. 1 to 4.
Web Archive of https://developer.apple.com/augmented-reality/arkit/, https://web.archive.org/web/20190808233419/https://developer.apple.com/augmented-reality/arkit/, Aug. 8, 2019, pp. 1 to 2.
Web Archive of https://rtfkt.com/, https://web.archive.org/web/20200924111637/https://rtfkt.com/, Sep. 24, 2020, pp. 1 to 10.

* cited by examiner

PATTERN-TRIGGERED OBJECT MODIFICATION IN AUGMENTED REALITY SYSTEM

CROSS-REFERENCE TO RELATED APPLICATIONS

This application claims priority to, and the benefit of, U.S. Provisional Patent Application 62/913,356, filed on 10 Oct. 2019, titled "SHADING AND TEXTURE MODIFICATION FOR AUGMENTED REALITY APPLICATIONS," and this application also priority to, and the benefit of, U.S. Provisional Patent Application 63/030,651, filed on 27 May 2020, titled "PATTERN-TRIGGERED AUGMENTED REALITY SYSTEM." The entire content each of the aforementioned patent-filings are hereby incorporated by reference.

BACKGROUND

1. Field

The present disclosure relates generally to computer graphics and, more specifically, to augmented reality.

2. Description of the Related Art

Mixed reality (MR) is a term that refers to a set of related technologies that display virtual objects in coexistence with physically-real objects during real-time operations. MR applications may be useful in a variety of industries, such as construction, education, and entertainment. MR operations can be performed using mobile computing devices in real-time operations, for instance, with wearable computing devices, like head-mounted displays. Real and virtual objects may be simultaneously displayed or interacted with during MR operations.

SUMMARY

The following is a non-exhaustive listing of some aspects of the present techniques. These and other aspects are described in the following disclosure.

Some aspects include a system configured to perform a process including obtaining a profile of a user. The process may include obtaining a set of images via a camera of the computing device. The process may include inputting, into a convolutional neural network executing on a computing device, the set of images. The process may include detecting, with the convolutional neural network executing on the computing device, a target physical object depicted in the set of images. The process may include determining a contour of the target physical object in pixel coordinates of the set of images. The process may include determining a first three-dimensional reconstruction in world-space coordinates of the target physical object based on the set of images and the contour. The process may include generating a virtual representation based on the first three-dimensional reconstruction. The process may include generating a virtual object based on a set of attributes of the virtual representation and the profile of the user, where a first attribute of the set of attributes includes the first three-dimensional reconstruction. The process may include associating the virtual object with the virtual representation, where a position of the virtual object is computed based on the contour of the target physical object. The process may include displaying the virtual object at pixel coordinates of a display that at least partially occlude at least part of the target physical object from a perspective of the user.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
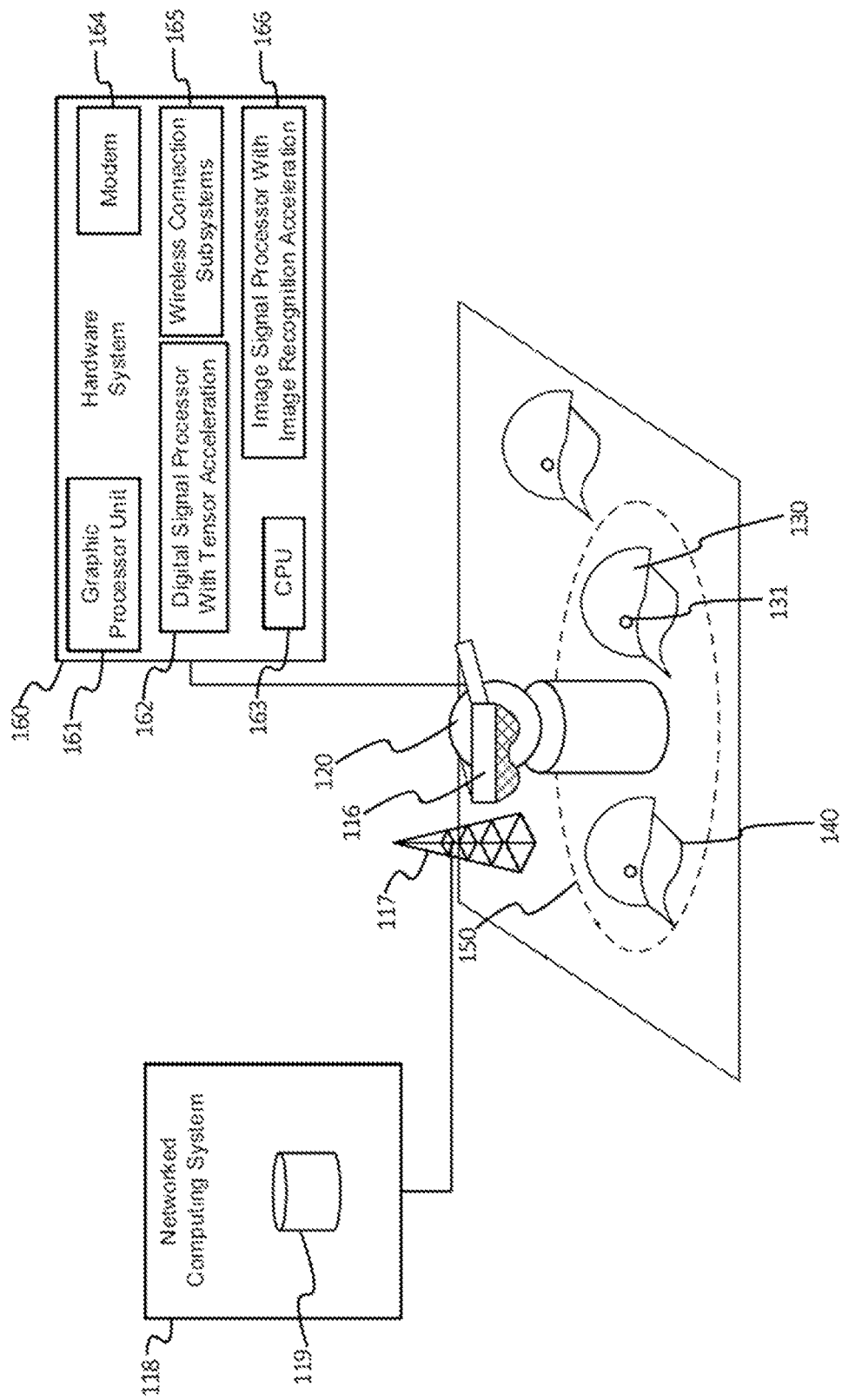
FIG. 1 depicts a computing environment for mixed reality applications, in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of mixed reality. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Mixed reality applications provide users with the ability to merge physical spaces with virtual objects. As use-cases and install-bases of mixed reality applications grow, user expectations for seamless transitions between real-world images and virtual displays is expected to increase, especially with respect to virtual objects related to the human body or physical objects attached to the human body. The so-called "uncanny valley," where moderately high-fidelity virtual objects are deemed particularly unappealing to users, is particularly acute when the objects are displayed in relation to bodies of humans or other familiar species (e.g., pets, like dogs, cats, and the like). Accuracy may be beneficial with respect to capturing the movement or other transformations of objects attached to such a body, and it is desirable that MR visualizations are anchored to, and move realistically with respect to, the human body or bodies of other species.

Some embodiments may obtain a set of images, such as a video stream or single images, and detect and localize in such images one or more target physical objects (e.g., using an on-device convolutional neural network and data from a user profile). Target objects may be two-dimensional (2D) or three-dimensional (3D) objects, like structured images encoding data, or structured volumes encoding data, such as a three-dimensional implementation of a bar-code or QR code. Some embodiments may determine spatial data associated with the target object, such as a set of points (e.g., in world coordinate system or an image coordinate system) representing points on the detected edge of the target physical object, a bounding box of the target physical object, or a contour of the target physical object. Some embodiments may analyze visual or other data to determine a partial or entire 2D or 3D reconstruction of the target physical object, such as point-cloud or polygon mesh in the world coordinate system (i.e. "world-space coordinate system") representing cloth topology, surface roughness, or the like. Some embodiments may infer a virtual representation target physical object (e.g., the point-cloud or polygon mesh in the world coordinate system), and in some cases, the virtual representation may include the contour (or other texture data) and the set of points. Some embodiments may then generate virtual object that will be displayed in relation with the virtual representation (e.g., with world-consistent pose, scale, lighting, shadows, and occlusion), where attributes of the virtual object may be affected by attributes of the virtual representation. For example, the virtual object may be applied as a contour or other type of texture to a surface of the virtual representation and displayed.

Some embodiments may detect a target feature of a physical object based on a set of target feature parameters. The virtual object may then be generated based on data obtained from communication with another computing device, such as data including a version of the virtual object from a repository based on the target feature. Obtaining a virtual object may include obtaining data characterizing the virtual object, such as a mesh or point-cloud model of the virtual object, a contour or other texture of the virtual object, a dimension of the virtual object, or the like. Some embodiments may update the version of the virtual object based on attributes of the physical object, such as a hash value generated from an image of a target feature of the physical object. Some embodiments may anchor the virtual object with respect to the position of the target feature. By wirelessly retrieving data used to generate a virtual object from a remote server via a network, some embodiments may increase the number of virtual objects that may be generated (e.g., configured or created), increase the complexity of the virtual objects being displayed, or dynamically update a virtual object to resolve errors or discrepancies.

FIG. 1 depicts a computing environment for mixed reality applications, in accordance with some embodiments of the present techniques; Some or all of the operations described in this disclosure may be implemented in the computing environment 100 shown in FIG. 1. In some embodiments, the computing environment 100 may include a mobile computing device 116, where the mobile computing device 116 may include a cellular phone, a pair of smartglasses, a smartwatch, a head-mounted display (like AR or VR headsets), a tablet, a laptop computer, some combination thereof, or the like. For example, the mobile computing device 116 may include a Microsoft Hololense™, Facebook Oculus Quest 2™ (e.g., using pass-through display), Magic Leap™ head-mounted displays, Epson Moverio BT-300™ or the like.

In some embodiments, a user 120 may use the mobile computing device 116 to obtain a set of images of a wearable item 130 and a feature 131 that is affixed to the wearable item 130 (e.g., printed on, stuck to, engraved in, etc.). The set of images may include a single image, a gallery of images, a video stream, or the like, in some cases with time-stamps and pose in world coordinates of the device 116 associated with each image indicating pose of a camera of the device when each image was captured. Images can be 2D images or 3D images, having a depth channel with distance of pixels from the headset, for instance inferred with depth sensors or visual simultaneous localization and mapping algorithms (like direct sparse odometry, semi-direct visual odometry, LSD-SLAM, DTAM, RGB-D vSLAM, Direct RGB-D Odometry, or others), which in some cases may be executed on-device 116, in real-time (like updating a map within less than 20, 50, or 200 milliseconds of obtaining an image). In some embodiments, the mobile computing device 116 may send or receive wireless signals to the wireless signal antenna 117. The wireless signal antenna may include or otherwise be in communication with a networked computing resource 118, which may be used to provide computational resources such as processing power, memory storage, or the like. In some embodiments, the networked computing resource 118 may include a repository 119 that may be store one or more values used by one or more operations described in this disclosure, where the values of the repository 119 may be added to, retrieved from, or otherwise updated by the mobile computing device 116. In some embodiments, the networked computing resource 118 may act as a local computing node of a distributed computing system, a node of an edge-based computing network, a host for a containerized application of computing service, or the like. In some embodiments, the networked computing resource 118 may be or include a server that stores a set of model parameters in the repository 119 used to generate a virtual object, which may then be retrieved via a wireless session between the server and the mobile computing device 116.

Reference to "an image" followed by reference to "the image" should not be read to suggest that the image may not be transformed in some way. The subsequent reference should be read broadly as encompassing either the original, untransformed form of the image or a transformed form of the image. For instance, reference to "an image" may refer to an original color image, and then a statement that "the image is scaled" can include scenarios where the original color image is scaled or a greyscale version of that image is scaled. Similar logic applies to other transformations, like cropping, scaling, rotating, affine transforms, isolating color channels, changing color spaces or coordinate systems, and the like.

A feature may be represented as information about a portion of an image having one or more properties that may distinguish the portion from other portions of an image, and may include shapes, patterns, colors, three-dimensional shapes, three-dimensional patterns, or the like. Features may be engineered or learned. For example, the feature 131 may include a hexagon, a photographic picture, a symbol, a machine-readable optical label such as a QR code or a barcode, another type of optical label having a structured pattern, or the like. In some embodiments, the feature 131 may include three-dimensional elements, such as a series of grooves, a set of three-dimensional shapes, a set of protrusions from a flat surface, or the like. A feature may include visual elements that are detectable using an optical sensor such as a luminosity sensor, a camera, a light detection and ranging (Lidar) sensor, a Radar sensor, an infrared sensor, an ultraviolet light sensor, or the like. A feature may also be detectable using other sensors, e.g., with ultrasonic mapping. For example, a target feature may include a set of protrusions and grooves forming an engraving of a QR code, and a Lidar sensor or an ultrasonic sensor may be used to detect the target feature.

In some embodiments, the feature 131 may include materials that do not reflect or emit electromagnetic ("EM") waves (e.g., light) or reflects or emits relatively few EM waves for EM waves in a first frequency range but reflects or emits a significant portion of EM waves a second, different frequency range. For example, a material of the feature 131 may reflect less than 20%, less than 5%, or less than 1% of light in a visible spectrum, such as light having a wavelength between 400 nanometers (nm) and 700 nm but reflect more than 25%, more than 40%, more than 75%, or more than 95% of light in an infrared light range (e.g., 750 nm to 1000 nm). Some embodiments may take advantage of this feature by using sensor readings of an optical sensor that detects light outside of the visible spectrum. For example, the feature 131 may include a machine-readable optical label having a structured pattern such as a QR code (or other scannable pattern like those described herein) printed in a material that reflects more than 40% or more than 80% of light having a wavelength between 600 nm to 1000 nm in some areas and reflects less than 50%, less than 20%, or less than 10% of light having a wavelength between 3 nm and 600 nm (e.g., on a background field that has different properties in this regard, such that printed features are optically detectable as distinct from the background field).

In some embodiments, a feature may include a pattern of materials with different reflectivity or emissivity configured to create a structured pattern or other distinguishable feature may make the structured pattern or distinguishable feature be indistinguishable in the visible spectrum. For example, a feature may appear as a black box or a white box in visible light while, a pattern, symbol, or other shape may be detectable using an optical sensor capable of sensing EM waves having frequencies outside of the visible spectrum (e.g., infrared light, ultraviolet light, or the like). While the above describes the use of a features having reflective materials, the operations described in this disclosure may be also be applicable to features exhibiting other EM wave-providing behavior such as luminescent behavior, fluorescent behavior, phosphorescent behavior, or the like. In some cases, the "dark" areas of an machine-readable, infra-red responsive, visible-spectrum un-responsive, printed pattern may re-radiate less than 5%, 10%, or 50% of the illuminating infra-red light than an amount of such light re-radiated by "light" areas of the infra-red machine readable pattern. By determining object attributes or anchor points using features that are not detectable by human eyes or sensors configured to detect light in the visible spectrum, some embodiments may provide increased interactivity in mixed reality applications, reduce conspicuousness of visible features used for mixed reality applications, or effective surface space to displace information.

In some embodiments, the feature 131 may be specific to the wearable item 130. For example, the feature 131 may include a symbol encoding a unique item identifier that is specific to the wearable item 130. Alternatively, or in addition, the feature 131 may be duplicated throughout multiple items. For example, the feature 131 may include a symbol that is visually detectable on both the wearable item 130 and the wearable item 140. In some embodiments, a determination may be made by the mobile computing device 116 or the networked computing resource 118 that a number of other items visually similar to the wearable item 130 are below or otherwise satisfy a threshold value and, in response, generate a virtual object for each time the mobile computing device 116 detects a shirt similar to the first shirt. In some embodiments, the virtual object may be displayed based on data encoded in the feature 131, application data stored on the mobile computing device 116, device profile data or user profile data stored on the mobile computing device 116, data stored in the networked computing resource 118, data retrieved from other data sources, or the like.

As shown in FIG. 1, the wearable item 130 may include an article of clothing, such as a hat. Alternatively, or in addition, various other wearable items may include a feature usable by one or more operations disclosed in this application. For example, the wearable item may include a shirt, pants, shoes, socks, gloves, glasses, other articles of clothing, jewelry, or the like. For these purposes, tattoos, temporary and otherwise, are also considered types of articles of clothing, as is a pattern applied with makeup. Furthermore, while the feature 131 is positioned as a pattern on the wearable item 130, other embodiments may include operations to display a virtual object based on the capture of features on other physical objects such as a living organism, a wall, a tool, a piece of furniture, an electronic device, or the like.

In some embodiments, a set of values representing attributes of the wearable item 130 or the feature 131 may be stored in association with the feature 131. For example, the set of values may be stored on a database in association with a target feature identifier. The set of values may include an identifier, dimensions of a 3D model, an image of the target feature, a set of parameters usable by a computer vision subsystem to recognize the target feature, or the like. The set of parameters usable by the computer vision subsystem may include neural network weights, biases, hyperparameters, or the like, where the use of the set of parameters by a computer vision subsystem may provide means of determining whether a feature is a target feature. For example, a 3D model of a hat representing the wearable item 130 or a set of neural network weights and biases of a convolutional neural network (CNN) subsystem trained to recognize the wearable item 130 may be stored in association with the feature 131. Alternatively, or in addition, an identifier of a set of parameters may be associated with the target feature identifier and stored in in a local memory of the mobile computing device or a wirelessly connected computing resource. In some embodiments, a computer vision subsystem may be used first to determine the presence of the item associated with a target feature and then be used to determine the presence of the target feature after the item is detected.

In some embodiments, an item associated with a target feature may be tracked by a location. For example, the mobile computing device 116 may store, in a memory storage of the mobile computing device 116 or the networked computing resource 118, a location associated with the wearable item 130 or its own location when obtaining an image of the wearable item 130. In some embodiments, the mobile computing device 116 may store or otherwise access a database storing the known locations associated with the wearable item 130 based on the set of locations at which the feature 131 or the wearable item 130 had previously been detected. For example, after the mobile computing device 116 is used to associate the wearable item 130 with the feature 131 in a memory storage, some embodiments may transmit the geolocation of the mobile computing device 116 to the networked computing resource 118, a cloud computing resource, or the like. In some embodiments, the mobile computing device 116 may send a query to a database of the networked computing resource 118 to determine how many other items similar to the wearable item 130 are present within a known geographic range represented by a geographic boundary 150. In some embodiments, a computing system may determine that the number of other items satisfy a threshold value.

In response, some embodiments may generate (e.g., configure or create) a virtual object each time the computing system detects an item similar to the wearable item 130 instead of, or in addition to, each time a target feature is detected. For example, some embodiments may use a first neural network and its corresponding first set of neural network parameters to determine a neural network result. The neural network result may be used to identify the wearable item 130, which may be a first target object. In response receiving a message that at least one other versions of the wearable item 130 exist within a geographic range, some embodiments may use a second neural network and a corresponding second set of neural network parameters capable of detecting a second version of the target object within the geographic range. In some embodiments, the second neural network may have a lower accuracy tolerance than the first neural network, which may decrease processing time required to detect the second shirt. After detecting the wearable item 140 within the geographic boundary 150, where the wearable item 140 may be a second version of the wearable item 130, some embodiments may then obtain and generate a second version of a virtual object first generated for the wearable item 130. In some embodiments, the second version of a virtual object may be displayed as being attached to the wearable item 140. Additionally, some embodiments may limit virtual object generation for wearable items outside of this geographic range, such as a wearable item 190 that is outside of the geographic boundary 150.

In some embodiments, some or all of the object recognition operations described above may be performed using the mobile computing device 116 itself without communicating with the networked computing resource 118. In some embodiments, the mobile computing device 116 may include the computing system 160, which may include one or more components specialized for mixed-reality applications. In some embodiments, the computing system 160 may include a graphic processor unit (GPU) 161, a digital signal processor (DSP) 162, a central processing unit (CPU) 163, a modem 164, a wireless connection subsystem(s) 165, an image signal processor (ISP) 166, or a processor security subsystem 167. In some embodiments, one or more the components of the computing system 160 may include elements that enable the operations of a mixed-reality system to display virtual objects anchored to real-world objects in a visual display.

In some embodiments, the DSP 162 may include a microprocessor or other set of integrated circuits that may execute computationally-intensive operations used by implementations of a set of digital signal processing algorithms. In some embodiments, the DSP 162 may include a set of hardware vector accelerators specialized for performing operations for one-dimensional arrays. In some embodiments, the DSP 162 may include a set of hardware tensor accelerators. A hardware tensor accelerator (e.g., "tensor processing unit," "TPU," or the like, such as an edge TPU) may include an application-specific integrated circuit (ASIC) specialized for large volumes of low-precision computations (e.g., 8-bit computations, 16-bit computations, or the like). The hardware accelerator may be a physical chip or region of silicon within the device 116 and may have a different level of precision of computation (e.g., lower) than that of a CPU of the device 116. Other examples include the Pixel neural core in Google devices, the neural processing unit microprocessor used in some iOS™ devices or the hardware invoked by the Snapdragon Neural Processing Engine from Qualcomm™. In some cases, such hardware may be configured to operate on data in a floating-point radix format, like bfloat16, which is expected to sacrifice some accuracy in exchange for much greater concurrency in a way in which the loss of accuracy has relatively little effect on computer vision computations. In some embodiments, a hardware tensor accelerator may include integrated circuitry for a matrix multiplier unit, united buffer unit, and activation unit for activation functions. By using specialized integrated circuits for one-dimensional array operations and multi-dimensional matrix multiplication operations, the various low-precision, high-volume computations useful for use during computer vision operations or other augmented reality operations may be improved. By using hardware tensor accelerators instead of or in addition to CPUs or GPUs for computer vision operations, some embodiments may provide real-time responsiveness or processing efficiencies that would not be available to mobile computing devices that do not use hardware tensor accelerators.

In some embodiments, the CPU 163 may include multiple cores. For example, the CPU 163 may include a first core having a clock speed between 2.5 Gigahertz (GHz) to 3.5 GHz, a second set of cores between 2.0 GHZ and 2.5 GHz, and a third set of cores between 1.5 GHz and 2.0 GHz. In some embodiments, the CPU 163 may include a set of caches corresponding to each of the cores.

In some embodiments, the ISP 166 may include specialized computer vision hardware accelerators for computer vision operations such as object classification, object segmentation, and depth-sensing. Various augmented reality operations may include one or more computer vision operations, where the use of computer vision hardware accelerators may provide improvements to the response speed and power consumption of mobile computing devices when performing augmented reality operations. In some embodiments, using a computer vision hardware accelerator may include using a camera's video output (or other sensor output, such as Lidar sensor output) as inputs via direct interfaces with a camera subsystem, which may reduce a computational load by bypassing a bus or other intermediary systems between an image capture subsystem and components capable of performing computer vision operations. In some embodiments, the computer vision hardware accelerator may take multiple types of sensor outputs as inputs. For example, a computer vision hardware accelerator may take a combination of a Lidar sensor, radar sensor, camera, ultrasound sensor, or the like to perform augmented reality operations.

In some embodiments, the modem 164 may be capable of high bandwidth systems, such as greater than 500 Mbps, greater than 1 Gpbs, greater than 1.5 Gpbs, greater than 2.0 Gpbs, or the like. In some embodiments, the modem 164 may include a plurality of antennas capable of receiving a plurality of wavelengths simultaneously. For example, the modem 164 may include a first set of antennas for receiving and transmitting wireless signals operating at millimeter-wavelength bands and a second set of antennas for receiving and transmitting wireless signals operating at LTE bands or other lower bandwidth frequency bands. In some embodiments, as further discussed below, the ability to switch between different frequency bands associated with different bandwidths may provide increased versatility when moving a mobile computing device 116 through an area. This increased versatility may reduce device power consumption and increase a recognition accuracy of the mobile computing device 116 by allowing the device to transition between using the networked computing resource 118 when a signal metric such as signal strength or signal noise satisfy a signal metric threshold and use on-device computing resources such as the DSP 162, CPU 163, or ISP 166 otherwise.

In some embodiments, the computing environment 200 may include a first mobile computing device 211 and a second mobile computing device 221. The first mobile computing device 211 may obtain a first set of images 212 that include images of an item 202 and a feature 201 printed on the item 202. For example, the first mobile computing device 211 may record a video that captures the item 202 and its corresponding feature 201. Similarly, the second mobile computing device 221 may obtain a second set of images 222 that include images of the item 202 and the same feature 201. The first mobile computing device 211 may store a first set of profile data 213, where the first set of profile data 213 may be associated with a user of the first mobile computing device 211, the first mobile computing device 211 itself, or the like. For example, the first set of profile data 213 may be determined from a user profile stored on the first mobile computing device 211. Similarly, the second mobile computing device 221 may store a second set of profile data 223, which may be associated with a user of the second mobile computing device 221, the second mobile computing device 221 itself, or the like. As discussed elsewhere in this disclosure, the profile data 213 or 223 may be used to determine a model, model attribute, or the like for a virtual object.

In some embodiments, the mobile computing device may send the first set of images 212 to a networked computing resource 250 via a wireless signal for computer vision operations, virtual object generation operations, data storage operations, or other operations. The networked computing resource 250 may include or otherwise have access to a profile repository 251 and a model parameters repository 252. The profile repository 251 may include a set of stored profiles associated with different users, devices, applications, entities, or the like. For example, the profile repository may include a profile identifier associated with the first set of profile data 213 and the second set of profile data 223. Alternatively, or in addition, the profile repository 251, model parameter repository 252, or virtual objects repository 253 may be stored on any or all of the first mobile computing device 211, second mobile computing device 221, or any other mobile computing device(s). Similarly, in some embodiments, some or all of the operations described above may be performed locally on a mobile computing device.

In some embodiments, the networked computing resource 250 may use a set of parameters retrieved from the model parameters repository 252 for a machine learning model to identify a set of target features. Some embodiments may retrieve the set of parameters based on a default identifier associated with the application being executed on the mobile computing device, an identifier associated with the profile data, or the like. Alternatively, or in addition, the set of parameters or identifiers for the set of parameters may be sent from a mobile computing device. For example, some embodiments may provide a set of parameters used to identify a feature via a network of mobile computing devices in communication with each other.

After one or more computer vision operations, the networked computing resource 250 may select, generate, or otherwise provide a set of virtual objects and a set of anchors for the virtual objects based on the set of target features detected in a first set transmitted image data 214. The set of virtual objects and the set of anchors may be collectively sent to the first mobile computing device 211 as a first set of augmented reality data 215. The first mobile computing device 211 may then use the first set of augmented reality data 215 to display the first set of virtual objects anchored to the first set of anchors stored in the first set of augmented reality data 215.

In some embodiments, the second mobile computing device 221 may send a second set of images 222 and a second set of profile data 223 to the networked computing resource 250 via a wireless signal. In some embodiments, the networked computing resource 250 may use profile data to retrieve a second model parameter identifier. In some embodiments, the second model parameter identifier may be used to retrieve a second set of parameters from the model parameters repository 252 for a machine learning model or select a second virtual object from the virtual objects repository 253. After one or more computer vision operations, the networked computing resource 250 may select, generate, or otherwise provide a set of virtual objects and set of anchors for the virtual objects based on the set of target features detected in a second set of transmitted image data 224. The set of virtual objects and set of anchors may be collectively sent to the second mobile computing device 221 as a set of augmented reality data 225, which may be associated with a different set of virtual model parameters than the first set of augmented reality data 215. The second mobile computing device 221 may then use the set of augmented reality data 225 to display the second set of virtual objects anchored to the second set of anchors stored in the augmented reality data 225. As shown by this example, in some embodiments, a same feature(s) may trigger different versions of an application executing on different mobile devices to display different virtual objects based on their different profile values.

Figure 2:
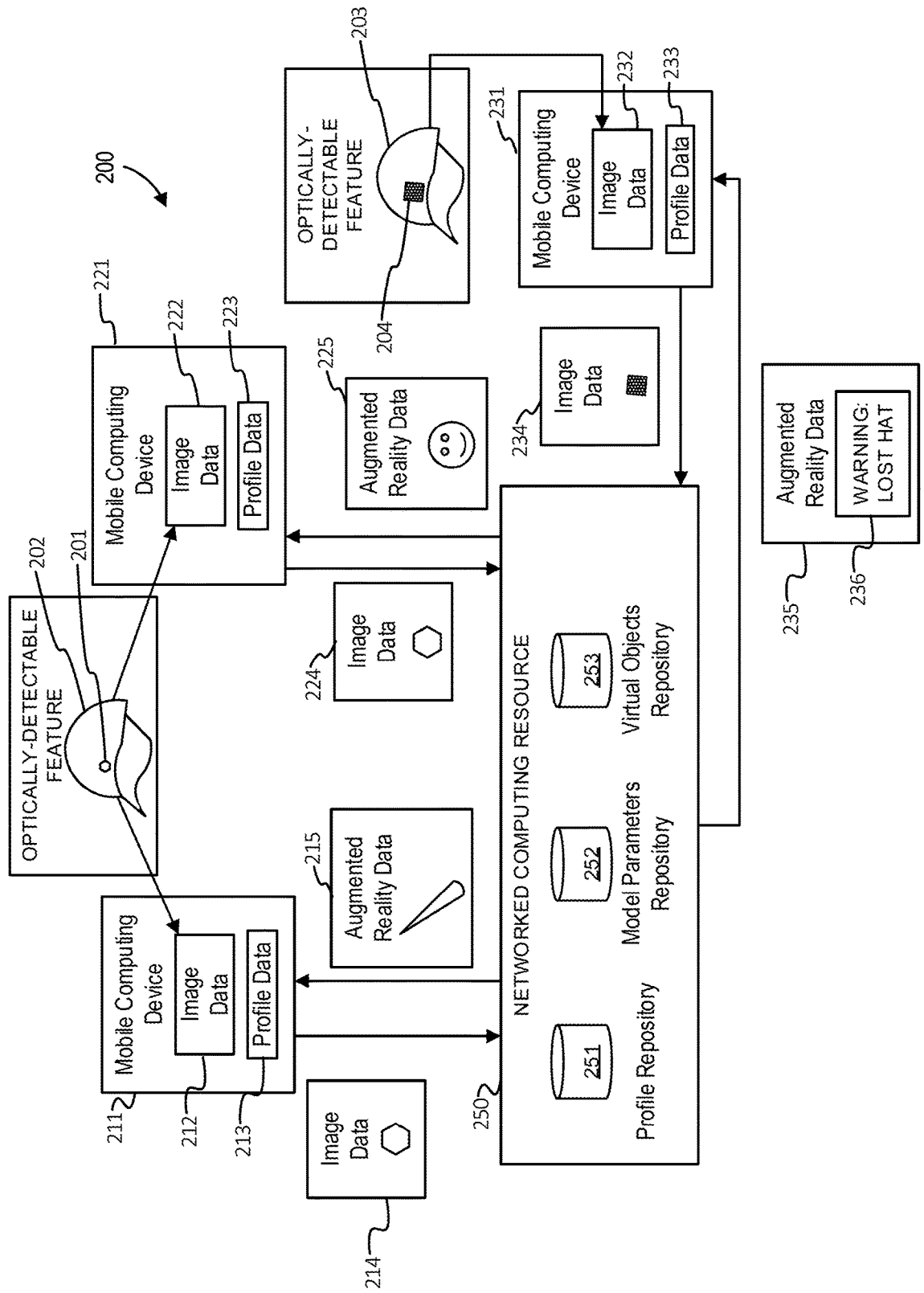
FIG. 2 depicts a data environment for mixed reality applications using mobile computing devices, in accordance with some embodiments of the present techniques.

In some embodiments, a virtual object being displayed may be changed without a corresponding change in the visual feature that triggers or otherwise causes the display of the virtual object. For example, the QR code 204 may be a target feature on an item 203 that is originally associated with a virtual object shaped like a geometric circle. As shown in FIG. 2, some embodiments may display the geometric circle at an anchor point determined by the position of the QR code 204. Before a first time point, a third set of profile data 233 and a third set of transmitted image data 234 determined from a third set of images 232 associated with the QR code 204 may be sent to the networked computing resource 250. The networked computing resource 250 may send a set of feature data causing a third mobile computing device 231 to display the geometric circle overlaid on the QR code 204 at an anchor point set by the QR code 204.

In some embodiments, the third mobile computing device 231 may then update the profile data 233 after the first time point. The update to the profile data 233 may update the networked computing resource 250 and may cause a change to the profile repository 251, the virtual objects repository 253, or some other repository of the networked computing resource 250. The update may cause a networked computing resource 250 to provide a set of augmented reality data 235 that includes a warning message 236 indicating that the item displaying the QR code 204 is a lost item. In some embodiments, the dynamic updating of virtual objects associated with a feature may be useful for brand recognition, personal security, loss prevention, or the like.

Figure 3:
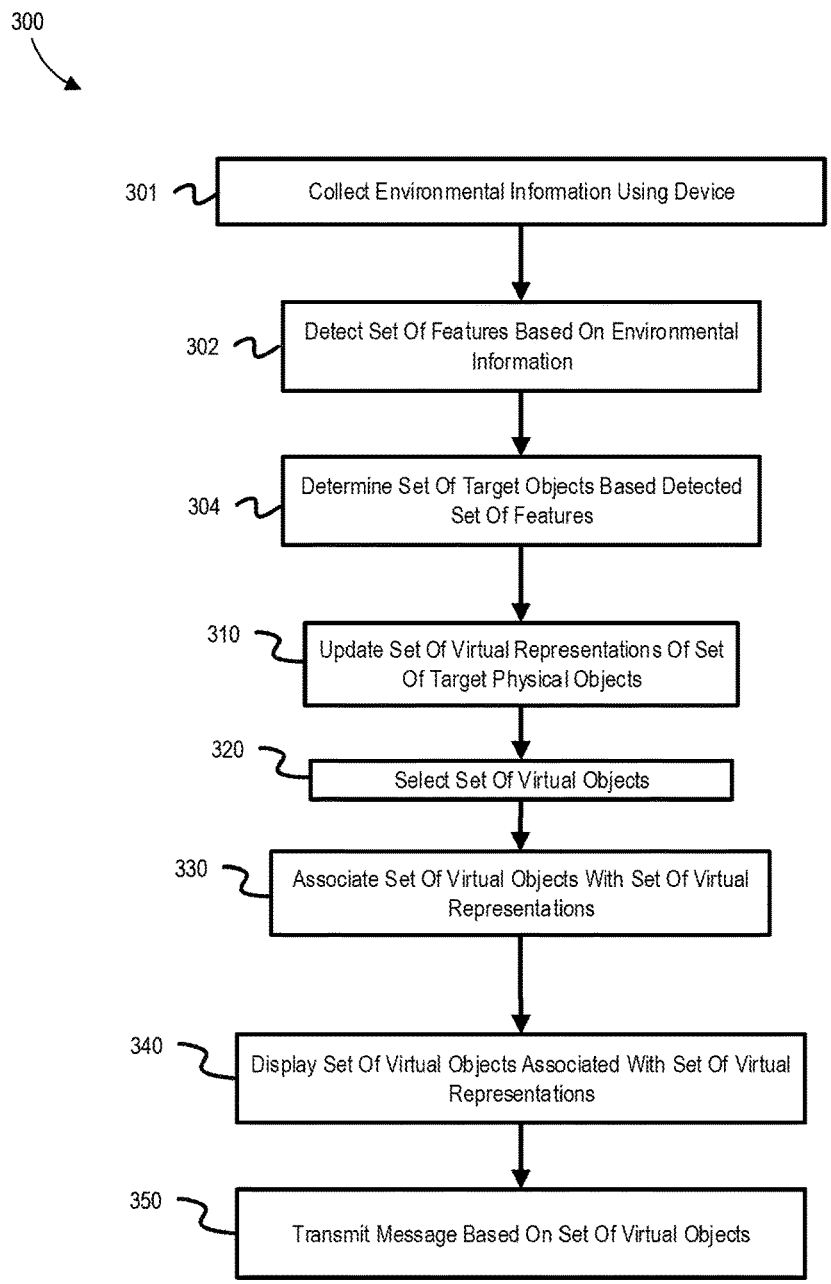
FIG. 3 is a flowchart of operations to associate a virtual object with a physical object, in accordance with some embodiments of the present techniques.
Figure 4:
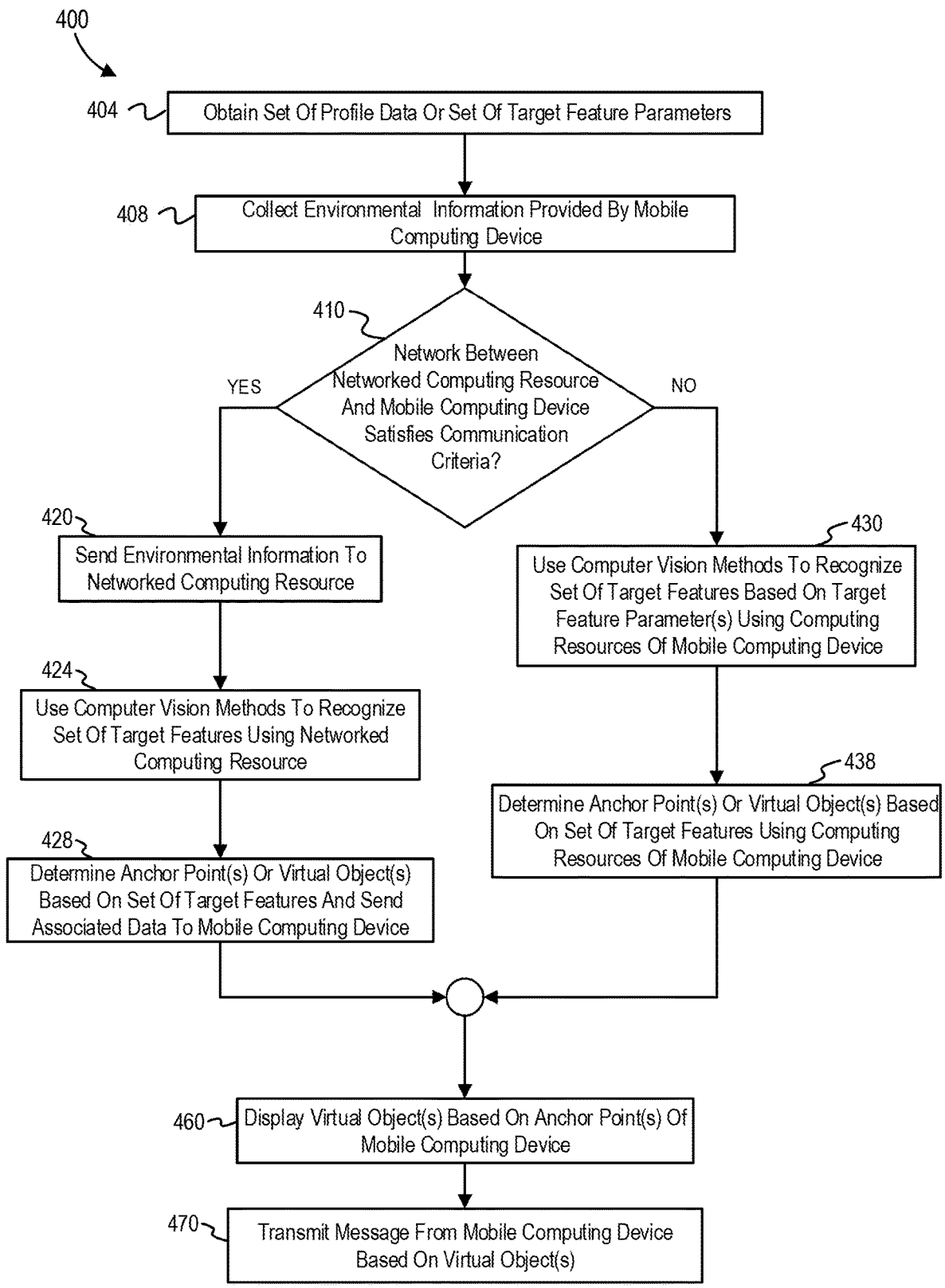
FIG. 4 is a flowchart of operations to cause the display of a virtual object, in accordance with some embodiments of the present techniques.

FIGS. 3 and 4 include flowcharts of the process 300 and the process 400, respectively. In some embodiments, the various operations of the processes 300 or 400 may be executed in a different order, operations may be omitted, operations may be replicated, additional operations may be included, some operations may be performed concurrently, some operations may be performed sequentially, and multiple instances of the processes 300 or 400 may be executed concurrently, none of which is to suggest that any other description herein is limited to the arrangement described. In some embodiments, the operations of the process 300 or process 400 may be effectuated by executing program code stored in one or more instances of a machine-readable non-transitory medium, which in some cases may include storing different subsets of the instructions on different physical embodiments of the medium and executing those different subsets with different processors, an arrangement that is consistent with use of the singular term "medium" herein.

FIG. 3 is a flowchart of operations to associate a virtual object with a physical object, in accordance with some embodiments of the present techniques; In some embodiments, the process 300 includes obtaining environmental information using a device, as indicated by block 301. In some embodiments, the device may be a mobile computing device, such as a cellular phone or tablet. For example, the environmental information may include visual information in the form of single images or video images from one or more cameras attached to the device. Visual information may also include data associated with images or videos that are sent to the device via a wired or wireless connection. Visual information may be collected using various specific types of light sensors, such as a structured light sensor, time of flight sensor, or stereo camera sensor. Alternatively, or in addition, the environmental information may include other sensor information such as proximity information obtained by a Lidar sensor. For example, some embodiments may collect Lidar data indicating a distance of an object and a surface contour of the object based on a set of images, where this Lidar data may then be used to detect one or more features of the set of images.

Various other sensors may be used to provide environmental information, such as a Radar sensor or ultrasound sensor. For example, some embodiments may use acoustic sensors such as ultrasound sensors or audible sound sensors to measure sound waves, which may improve accuracy when determining the position of a detected object or feature of the object or determining an attribute of the object or feature of the object. Some embodiments may use environmental information, such as images, Lidar measurements, or acoustic data, to generate a 3D point cloud map or other depth map of the world around the device.

Some embodiments may use data collected by various sensors of device 116 to determine a device position, device orientation, device motion, or the like, which may then be used to determine the orientation or position of a feature detected by a device. Some embodiments may include three or six degree of freedom tracking of the device 116 in world space. For example, some embodiments may collect motion data provided by an accelerometer, orientation data provided by a gyroscope (or other inertial measurement unit, like a 3 or 6 axis IMU), location-based data provided by a magnetometer or a Global Positioning System (GPS), or the like to determine feature data such as an angle at which the feature exists or is recorded. In some cases, pose may be inferred based on received ultrawideband transmissions from a plurality of UWB transmitters in range, for instance with the Nearby Interactions framework on iOS. The UWB signals may have a bandwidth of at least 500 MHz, and may operate with a relatively low transmit power (0.5 mW/−41.3 dBm/MHz). The frequency range of UWB may be between 3.1 and 10.6 GHz. A NearbyInteraction (NI) framework or library of the OS of the device 116 may be used by a native application to acquire 3D vectors from the device 116 to other UWB transmitters in range (e.g., within less than 50 or 200 meters), and relative or absolute pose of the device 116 in world coordinates may be inferred from a plurality of such vectors (in some cases, with use of a Kalman filter applied to a stream of such vectors to mitigate the effects of noise). To participate in an interaction, peer devices in physical proximity may consent to share their position and device tokens that uniquely identify the device. When the app runs in the foreground, NI may notify the interaction session of the peer's location by reporting the peer's direction and distance in meters, e.g., as a series of interrupts, events sent to a registered process, or as callbacks to a function of the native app registered with the device 116's OS. Additionally, some embodiments may determine a device position relative to other objects in an environment via extra ultra-wide band (UWB) technology, infrared sensors, and the like. For example, some embodiments may determine the position of a feature based on a set of images collected by a camera, an estimated distance from the feature while the set of images were collected determined using a Lidar sensor, and a set of depth maps collected by other electronic devices and communicated via UWB signals. This data may be then aggregated or analyzed to detect various, distinct physical objects or features of the physical objects.

In some embodiments, the process 300 includes detecting a set of features based on the obtained environmental information, as indicated by block 302. Some embodiments may filter or otherwise modify visual information and other information as a part of implementing a set of computer vision methods to detect a target feature, where the target feature may include a physical object or a portion of the physical object. Some embodiments may collect motion tracking data, environmental interpretation data, or light estimation data before applying computer vision operations. The trajectory of features provided by motion tracking data may be used to determine a device pose (i.e. the position of the device relative to its environment and the device orientation). Some embodiments may then transform or otherwise pre-process the visual information to generate a set of transformed shapes before applying machine learning operations. For example, some embodiments may determine a device orientation relative to a set of features and then apply a rotation matrix transform based on the device orientation to transform a set of shapes. Alternatively, or in addition, some embodiments may decrease an image resolution of a set of images to reduce the computational resources, convert the set of images to a grey-scale representation, or convert the set of images to a black-and-white representation before using machine learning operations to detect a set of features.

Various algorithms may be implemented to detect features, determine feature positions, or determine their corresponding feature attributes. Some embodiments may implement methods used in visual simultaneous localization and mapping (SLAM) technology. For example, some embodiments may perform keyframe analysis on a set of images sequenced by time (e.g., frames of a video) to track a feature position via a direct method that reduces each image into a sparse set of keypoints and tracks the relative motion of the keypoints over the image sequence. Alternatively, or in addition, some embodiments may perform dense or semi-dense visual SLAM operations, such as implementing a Lucas-Kanade algorithm or others described by Taketomi et al. (Taketomi, T., Uchiyama, H. and Ikeda, S., 2017. Visual SLAM algorithms: a survey from 2010 to 2016. IPSJ Transactions on Computer Vision and Applications, 9(1), p. 16).

Computer vision methods may include operations to recognize, segment, and analyze visual or other information about environment. Some embodiments may use various feature detection algorithms such as a scale-invariant feature transform (SIFT) algorithm, rotation-invariant feature transform (RIFT) algorithm, Speeded Up Robust Features (SURF) algorithm, where implementation of such algorithms are described by Li et al. (Li, J., Hu, Q. and Ai, M., 2018. RIFT: Multi-modal image matching based on radiation-invariant feature transform. arXiv preprint arXiv: 1804.09493), which is incorporated herein by reference. For example, SIFT and geodesic distance histogram (GDH) methods may be used to extract local features of an image, where implementations of the GDH methods may be similar to those described by Migliore et al. (Migliore, D., Matteucci, M. and Campari, P. P., 2008, January. Improving Geodesic Invariant Descriptors through Color Information. In International Conference on Computer Vision and Computer Graphics (pp. 148-161). Springer, Berlin, Heidelberg), which is incorporated herein by reference. Some embodiments may use a combination of different algorithms such as edge detection algorithms, corner detection algorithms, or blob detection algorithms to detect features. Examples of such algorithms may include the Canny algorithm, Sobel algorithm, Level Curve curvature algorithm, Maximally Stable Extremal Regions (MSER) algorithm, other algorithms described by de Carvalho et al. (de Carvalho, L. E. R. and Von Wangenheim, A., 2017. Literature review for 3D object classification/recognition), which is incorporated herein by reference. Some embodiments may use other algorithms to detect a feature, such as the Features from Accelerated Segment Test (FAST) algorithm as described by Mair et al. (Mair, E., Hager, G. D., Burschka, D., Suppa, M. and Hirzinger, G., 2010, September. Adaptive and generic corner detection based on the accelerated segment test. In European conference on Computer vision (pp. 183-196). Springer, Berlin, Heidelberg), which is incorporated herein by reference. Some embodiments may use a computer vision package such as the OpenCV computing package to perform some feature detection and modification operations.

Some embodiments may use of a set of neural networks or other types of machine learning models to detect one or more features. For example, some embodiments may use a convolutional neural network (CNN) to determine whether one or more features are present in an image, where the feature may include a target feature or a feature associated with the target feature. For example, some embodiments may detect a target feature associated with portions of a human body, where images may be indicated as including the target feature. Some embodiments may use a recurrent neural network, such as a recurrent CNN to analyze a series of images, where results of the analysis may be used to determine position and orientation of a set of features. For example, some embodiments may use a long short-term memory (LSTM) neural network to analyze one or more images, where the neural network results may be used to detect a set of features in the image that includes a human body, a portion of the human body, or an article of clothing on the human body.

Some embodiments may use separable convolutions for a CNN when implementing a computer vision method to detect a target feature, such as depth-wise separable convolutions for a CNN. For example, some embodiments may implement a depth-wise-separable convolution by first splitting an input stream into multiple channels based on color, light frequency, or the like. For example, some embodiments may split a captured image with dimensions of 100×100 pixels into three channels, such as a red input channel, green input channel, and blue input channel, where each channel has dimensions of 100×100. Some embodiments may apply a two-dimensional convolution filter, such as a 3×3 convolution filter, a 5×5 convolution filter, or some other size of convolution filter to one or more of the channels to generate a set of convolved images. For example, some embodiments may convert each of the 100×100 color-specific images for each color channel into a 96×96 convolved image. Some embodiments may then apply a three-dimensional convolution filter, such as a 5×5×5 convolution filter or some other sized convolution filter, to a stacked set of the convolved images. For example, some embodiments may stack the three previously-generated convolved images to generate a stacked set of images having dimensions of 96×96×3 pixels and apply point-wise convolution using a 1×1×3 convolution filter. Using the 1×1×3 convolution filter may result in the generation of a 96×96×1 image for each pixel of the 96×96×3 pixel in the stacked set, resulting in a set of 96×96×9216 stacked set of convolved values. Some embodiments may then perform neural networks using the set of convolved values to perform one or more computer vision operations, such as detecting a feature, categorizing a detected feature, or the like.

Some embodiments may use a depth-wise convolution separable CNNs to reduce computational load, in comparison to other convolution methods. By using depth-wise convolution, some embodiments may reduce the total number of transformation operations for multi-channel images when convolving an image without significantly reducing the accuracy of the results of the method(s). For example, some embodiments may use an implementation of Mobilenet, Mobilenetv2, Mobilnetv3, or the like, such as that described by Howard et al. (Howard, A., Sandler, M., Chu, G., Chen, L. C., Chen, B., Tan, M., Wang, W., Zhu, Y., Pang, R., Vasudevan, V. and Le, Q. V., 2019. Searching for mobilenetv3. In Proceedings of the IEEE International Conference on Computer Vision (pp. 1314-1324)) or Sandler et al. (Sandler, M., Howard, A., Zhu, M., Zhmoginov, A. and Chen, L. C., 2018. Mobilenetv2: Inverted residuals and linear bottlenecks. In Proceedings of the IEEE conference on computer vision and pattern recognition (pp. 4510-4520)), the contents of each of which are hereby incorporated by reference. Some embodiments may use a hardware tensor accelerator to perform one or more operations described in this disclosure. For example, some embodiments may use a TPU (like an edge TPU) of a headset to perform a set of depth-wise convolutions while using a convolutional neural network to detect a target feature, classify a detected object as a targeted object, or the like. In some cases, a deep convolutional neural network with more than 10 or more than 20 layers may be used. Some embodiments may include more than 10 or more than 20 different convolutional layers of varying size, in some cases with max pooling layers therebetween in the model architecture.

The set of features may include a set of three-dimensional shapes, two-dimensional shapes, or the like. For example, some embodiments may use a recurrent CNN to recognize the position or orientation of a non-moving feature such as a portion of a wall, a lamp post, a section of a billboard, or the like. Alternatively, or in addition, the set of features may include objects or portions of objects that are in motion, such as a vehicle, a robot, a drone, a non-human animal body, or a human body. In some embodiments, the neural network may be trained to recognize a plurality of different types of objects or categories of objects. For example, some embodiments may detect a first feature and a second feature. The first feature may be classified as a portion of a human body. The second feature may be classified as an object attached to the portion of a human body, such as an article of clothing, a piece of jewelry, a bag being carried, and the like.

In some embodiments, a geographical coordinate, such as one determined with a GPS system of a mobile computing device, may be used to determine the presence of a physical object. For example, some embodiments may obtain a set of data for a physical structure listed as within a distance range of the geographic coordinate, where the data may include images of the structure, structure dimensions, colors of the structure, contours of the structure, a topology of the structure, other attributes of the physical structure, or the like. Some embodiments may then verify whether a feature categorized as being the physical structure or being a portion of the physical structure by a neural network model executing on a mobile computing device is correct based on the set of data for the physical structure.

In some embodiments, the process 300 may determine a set of target objects based on the detected set of features, as indicated in operation 304. Some embodiments may select target features based on a target feature being physically attached to another feature or recognized object. For example, some embodiments may be trained to recognize a physical attachment based on a matching movement between a first feature indicating a first physical object and a second feature indicating a second physical object. For example, during or after determining the existence, position, or orientation of a portion of a human body and a set of objects attached to the human body, some embodiments may determine a physical attachment between the human body portion and the set of objects. Physical attachments between objects may include loose attachment, such as between a human arm and a fabric on the arm. Alternatively, or in addition, physical attachment may include elastic attachment, such as the attachment between an arm and a ball attached to the arm via a spring. Alternatively, or in addition, physical attachment may include rigid attachment, such as the attachment between an arm and a ball attached to the arm via a metal rod. For example, some embodiments may quantify a multi-dimensional motion of an article of clothing and a multi-dimensional motion of a human body, where the quantified motion may include a displacement, a velocity, or an acceleration. The trajectory of the position of the clothing may be compared to the trajectory of a visual feature of an arm, where the trajectories may be determined by analyzing images associated with different measurement times (e.g., images of a video file). If the two trajectories are determined as sufficiently similar, some embodiments may determine that the article of clothing is attached to the arm.

In some embodiments, an object determined as being attached to a portion of the human body may be determined to be a target object by default. For example, some embodiments may indicate that all discovered objects determined as being attached to a human body is included in a set of target physical objects. Alternatively, some embodiments may also require that the detected physical object is one of a set of target object categories. For example, after detecting that a shirt is attached to a portion of a human body and determining that the shirt is of a set of target object categories, some embodiments may add the shirt to the set of target physical objects.

Some embodiments may use one or more machine learning models trained or otherwise set to detect a target object based on a detected motion of the object with respect to itself. In some embodiments, one or more features of a physical object may be tracked. For example, some embodiments may track folds, shadows, stains, or other features of a shirt. Based on the motion of the physical object's tracked features with respect to themselves and to other physical objects, the physical object may be assigned a specific category or determined to be a target physical object. For example, example, some embodiments may apply a watershed transformation to an image to determine folds and segments of a detected physical object. Based on the folds and segments, the detected physical object may be categorized as a sweatshirt, where a determination may be that the sweatshirt is a target physical object.

Training may take a variety of forms. In some cases, the model is a supervised machine learning model, like a supervised computer vision model. Or some embodiments may use unsupervised models. In some embodiments, some or all of the weights or coefficients of the model may be calculated during training with a training set, like a set of labeled images. Some embodiments may execute a gradient descent optimization to reduce an error rate (or increase fitness) and select appropriate weighting and biases of the model. Some embodiments may train the model by, for example, assigning randomly selected weights; calculating an error amount with which the model correctly infers the labels applied to the training set error as a function of the weights and biases in the model in the vicinity of the current weights and biases (e.g., a partial derivative, or local slope, of the weight with respect to the error or fitness function (or other objective function)); and incrementing the weights or biases in a downward (or error reducing) direction (or in a fitness-increasing direction). Such "directions" may be in a relatively high-dimensional space, e.g., having more than 10,000 or more than 100,000 dimensions corresponding to the degrees of freedom of the model being trained. In some cases, these steps may be iteratively repeated until a change in error (or fitness) between iterations is less than a threshold amount, indicating at least a local minimum, if not a global minimum. To mitigate the risk of local minima, some embodiments may repeat the gradient descent optimization with multiple initial random values to confirm that iterations converge on a likely global minimum error. The resulting, trained model may be stored in memory and later retrieved for application to new images (and in some cases, other channels of information, like pose in three or six world coordinates).

Some embodiments may include one or more operations to detect a target two-dimensional feature that is a portion of a target object. For example, some embodiments may detect a feature including a QR code on a shirt identified as a target object. Some embodiments may compare the target two-dimensional feature to a set of stored feature data. In some embodiments, the target feature may include a fiducial marker, QR code, logo, and the like. The stored feature data may be stored in a mobile computing device or be stored in a remote data storage accessible via the mobile computing, and may be used to determine a set of attributes of a virtual object, as further discussed below.

In some operations, the process 300 includes operations to update a set of virtual representations of the set of target physical objects, as indicated in operation 310. A virtual representation of a physical object may include data indicating a position, orientation, or shape of the physical object. For example, some embodiments may generate or otherwise update a representation of a physical object that includes a surface model of the physical object, a rigged mesh model of the physical object including movable points indicating where the model can deform or otherwise move, colors of the physical object, surface contours of the physical object, or the like. Some embodiments may further use motion-tracking data, environmental interpretation data, or light estimation data to generate a virtual representation of the physical object.

As discussed elsewhere in this disclosure, some embodiments may use visual SLAM methods to update a virtual representation of an object or other feature in virtual space based on motions in a physical space. Some embodiments may determine attributes of a planar surface based on estimated positions of a cluster of feature points. For example, some embodiments may then determine a set of boundaries of the planar surface (or other virtual representation) based on the cluster of feature points and set an anchor point to a feature within the set of virtual representation boundaries. Alternatively, or in addition, some embodiments may apply hit-testing methods that include converting a detected feature into a position in virtual space and projecting a virtual ray in the direction of the position to select features or their associated virtual objects. One or more of the feature positions may be used as anchor points, where a virtual object is generated a position in reference to the one or more anchor points. Some embodiments may include using the anchor points as a trackable point, where a trackable point is associated with a feature that is tracked over time. Some embodiments may include the use of APIs obtained from AR development kits such as ARToolKit, Google ARCore, and Apple ARKit to perform AR-related activities such as track features, categorizing different physical objects, generating virtual representations, or the like. Alternatively, or in addition, some embodiments may include the use of custom-built, domain-specific functions not included in ARToolKit, Google ARCore, or Apple ARKit.

As disclosed elsewhere, some embodiments may update a mesh model based on the detection of an object represented by the mesh model or a portion of the mesh model. For example, some embodiments may determine a set of mesh parameters for a portion of human body such as limb length, full body height, and facial expressions based on measurements of detected features such as a human arm, human torso, human face, or other objects in physical space. Some embodiments may use the pose of a device relative to a recognized object such as a portion of a human body to transform a set of images, where using the set of transformed images may increase the accuracy of measurements used to determine the set of mesh parameters.

Some embodiments may assign a position on the surface of a virtual representation of a physical object or inside of the virtual representation of the physical object as an anchor point. For example, some embodiments may select a position on a planar surface in virtual space that is representing a table in physical space as an anchor point, to which one or more virtual objects may be attached to in a virtual space. Some embodiments may include instructions to re-rig a mesh of the virtual representation based on additional visual information. For example, some embodiments may detect a pivoting motion of an article of clothing (or another object) at a first position not represented by a point on a rigged mesh. In response, some embodiments may update the corresponding rigged mesh of the article of clothing to include a point associated with the detected pivoting motion such that the updated mesh includes a pivoting point at the first position.

Some embodiments may also update a virtual representation by determining the boundaries of an object in physical space. After determining the boundaries of a physical object, some embodiments may assign the positions of a set of mesh points of the virtual representation of the physical object to the boundaries of the physical object. For example, some embodiments may detect the boundaries of a shirt based on a set of images using one or more operations described above. Some embodiments may assign the shape formed by the physical object boundaries as a set of boundaries of the virtual representation. As discussed elsewhere in this disclosure, a virtual representation may include a set of properties, such as an associated contour or other texture data, set of colors, and the like. In addition, some embodiments may determine a position of an existing virtual representation and calculate a virtual position of a new virtual object to determine visual occlusion effects, where a portion of the new virtual object is occluded by a portion of the existing virtual object.

Some embodiments may also include shading, contours, textures, stains, or other attributes in a virtual representation. For example, some embodiments may generate a virtual representation of a red shirt, where the virtual representation includes a texture file or an association to a texture file representing a detected texture of the red shirt. Some embodiments may generate or update a new virtual object to include (or otherwise use) a set of attributes of the existing virtual representation. For example, some embodiments may include a brick texture in a virtual representation of a brick wall, where the brick texture may be represented by parameters usable to generate a simulated surface roughness.

In some operations, the process 300 includes operations to select a set of virtual objects, as indicated by block 320. A virtual object may include a two-dimensional (2D) object, such as a picture, a texture, a design, or the like. Alternatively, a virtual object may include a 3D object, such as a 3D model, a cloud of points, or other values associated with three-dimensional positions in a space. In some embodiments, the virtual objects may be assigned to a user profile and may automatically be loaded based on one or more values of a user profile. For example, some embodiments may perform a lookup operation to determine a profile based on profile identifier assigned to a device, obtain an object template identifier stored in the profile, and select a model template having the shape of a T-shirt with a plaid pattern associated with the object template identifier.

Alternatively, or in addition, a virtual object may be selected by a user to be added to a set of new virtual objects before or during the display of the set of new virtual objects further described below. For example, a model representing a first virtual object may be selected from a user interface and a version of the first virtual object may then be displayed to the user or other users executing different instances of an application having access to the selected virtual object. Furthermore, some embodiments may allow a first user to select a new virtual object or attribute(s) of the virtual object to be displayed and viewed by a second user without requiring changes in a physical object or a virtual representation of the physical object, as described elsewhere in this disclosure.

After selection, some embodiments may determine whether a mobile device executing one or more operations described in this disclosure includes a necessary asset to generate a new virtual object. If not, some embodiments may collect data stored in a remote server, cloud server, or data stored in a non-transitory machine-readable medium not physically attached a mobile device executing a mixed reality application in order to determine a set of new virtual objects. For example, an application executing on a first mobile computing device associated with a first user profile may collect data that is associated with a second user profile or a plurality of user profiles from a second mobile device or a cloud server via an API in order to generate a new virtual object or plurality of new virtual objects.

In some embodiments, the process 300 may associate the set of virtual objects with the set of virtual representations, as indicated by operation 330. As discussed elsewhere in this disclosure, a virtual representation may include data usable to represent an object or portion of an object in physical space. For example, the virtual representation may include a set of points representing a surface of a corresponding physical object, where each of the set of points may be usable as anchor points for connecting with a virtual object. The virtual representation may include textures and shading information based sensor measurements collected by a device. For example, a virtual representation may include a set of parameter values indicating pore distribution, pore size, or pore depth when simulating a surface texture of an object. Some embodiments may determine the position and orientation of a virtual object based on the visual information, device motion, or device pose.

Some embodiments may associate one or more attachment points of a virtual object with one or more anchor points of a virtual representation. For example, some embodiments may update a virtual model to be displayed as being attached to an anchor point of a planar surface representing a table. Alternatively, or in addition, some embodiments may recognize and position a set of virtual objects bristly targets virtual feature. For example, some embodiments may identify a QR code and position a rectangular shape in front of the QR code in a virtual representation of the physical object.

Some embodiments may generate, replace, or otherwise update a texture of the virtual object based on a virtual representation. For example, some embodiments may update the texture of a virtual object by combining the shape of a virtual object stored in a virtual object model template with a second texture of a brick wall to display a virtual object that appears as an extension of the brick wall when being displayed on a screen or headset. The textures may be combined using a UV texture mapping operation, such as forward texture mapping, inverse texture mapping, affine texture mapping, or the like. In some cases, the texture may be modified based on scene lighting or occlusion. For instance, some embodiments may cease displaying a portion of a texture in a region of a scene occluded by a person walking between the target object and the user. In another example, scene lighting may cause pixel brightness of the texture to be increased or decreased. For example, pixel brightness of a texture may be increased responsive to brightness of the target object increasing as the user walks next to a window on a sunny day.

Some embodiments may include one or more options to modify or otherwise update a virtual representation in real time. For example, some embodiments may display a virtual shoulder pad that is attached to an anchor point of a virtual representation of a T-shirt, such as mesh model representing the T-shirt. In response to a detected deformation of the T-shirt that changes the dimensions of the portion of the T-shirt that the virtual shoulder pad is attached to, some embodiments may update the shape, position, or orientation of the first virtual object. Such updates may include transforming the shape of the shoulder pad to match an increase or decrease in an updated width of the T-shirt model, shifting the position of the shoulder pad to track the position of an anchor point of the T-shirt model, or re-orienting the shoulder pad to match an orientation of an anchor point of the T-shirt model. In some embodiments, the display of a transformed shape or re-oriented shape may increase the interactivity of a mixed reality application.

In some embodiments, the first virtual object may be replaced by a second virtual object after a user selects the second virtual object from a list of virtual objects. For example, as described elsewhere in this disclosure, some embodiments may receive a message from a first mobile computing device having instructions to update the color of a first virtual object from a blue color to a red color. In response, a version of the virtual object that had previously had a red color when displayed on a second mobile computing device may be updated to have a blue color. Furthermore, some embodiments may allow the modification or replacement of a virtual object attached to a virtual representation without affecting other virtual objects attached to the same virtual representation or other virtual representations. For example, some embodiments may concurrently display three virtual objects and update an attribute of the first virtual object without updating the attributes of the second or third virtual attribute.

In some embodiments, the process 300 may include operations to display the set of virtual objects associated with the set of virtual representations, as indicated by operation 340. Some embodiments may display the set of virtual objects without the virtual representations themselves. For example, some embodiments may display a moving graphic on top of a headband, wherein the virtual representation of the headband itself is not displayed or is invisible. Displaying the set of virtual objects may include displaying the set of virtual objects on the screen of a mobile computing device, a computer monitor, a headset, or the like.

In some embodiments, the process 300 may include operations to transmit messages based on the set of virtual objects, as indicated by operation 350. Some embodiments may transmit a set of messages indicating a user's selections of new virtual objects. These messages may be transmitted to a remote server and accessed by other mobile devices or other applications. For example, a user may select a first virtual object and a second virtual object, and, in response, some embodiments may send a message indicating the selection of the first virtual object and second virtual object to a remote server to be stored in a record of the database (e.g. a user profile, a scoreboard, and the like). The record storing the selection of the first virtual object and second virtual object may then be accessed by a second instance of the application operating on a second mobile device.

Some embodiments may generate or otherwise update a record associated with the new virtual object, where the record may include a user-modifiable voting metric. The user-modifiable voting metric may be updated by a plurality of users, where the plurality of users may view the new virtual object or a visual record associated with the new virtual object. For example, a virtual object may include a virtual panda model, and a visual record associated with the virtual panda model may show the virtual panda sitting on a chair. A plurality of users may view and vote on the visual record of the virtual panda, wherein each vote may increase or decrease the value of a user-modifiable voting metric associated with the virtual panda. Some embodiments may then update one or more profiles associated with the virtual panda to provide voting results corresponding with the virtual panda.

FIG. 4 is a flowchart of operations to cause the display of a virtual object, in accordance with some embodiments of the present techniques; In some embodiments, the process 400 may include operations to obtain a set of profile data or a set of target feature parameters, as indicated by block 404. The profile data may be associated with a user profile of an application executing on a mobile computing device. In some embodiments, the profile data may be associated with a user profile stored on a mobile computing device and shared with other applications, such as a Facebook account profile or another social media profile, Amazon account profile, a Google account profile, a device authentication profile, or the like. In some embodiments, the set of profile data of a profile may be specific to a single application.

In some embodiments, the profile data may itself store or otherwise be associated with a set of target feature parameters, such as target feature identifiers, dimensions of a target feature, hash values computed from on a target feature, or the like. For example, the profile data may store a set of target feature identifiers, where each of the target feature identifiers may be used to retrieve a set of vector graphic images representing the corresponding target feature usable to categorize images as containing the corresponding target feature. Alternatively, or in addition, some embodiments may store other parameters usable to identify the target feature, such as a set of parameters usable by a machine learning model, a threshold value, or the like. For example, some embodiments may store a set of neural network parameters (e.g., weights, biases, activation function parameters, or the like) to detect one or more target features in a set of images.

In some embodiments, the set of target feature parameters may be stored as a character, sequence of numbers, string, or the like. In some embodiments, one or more parameters of a set of target feature parameters may be associated with a visual representation that is stored on a memory storage of a mobile computing device. For example, a target feature identifier may be associated with a vector graphic in the shape of a hexagon, where the vector graphic is also stored in the memory storage of the mobile computing device. Alternatively, or in addition, each identifier of a set of target feature identifiers may be associated with a visual representation that is stored on a memory storage of an external computing device that is not physically connected to the mobile computing device. For example, as further described below, the target feature identifier may be used by a cloud server or other remote computing device to retrieve a vector graphic stored on the remote computing device. Alternatively, or in addition, various feature parameters may be used in place of or in addition to the target feature identifier and may be referenceable or otherwise associated with the target feature identifier. Some embodiments may use the target feature identifier to retrieve a set of weights, biases, or other parameters of a trained neural network (e.g., capsule neural network) that is trained to identify an object type in a video file.

In some embodiments, a set of target feature identifiers may be associated with one or more images captured by a mobile computing device. Some embodiments may obtain a first image taken by a user operating a mobile computing device with a camera, extract a feature from the first image, and associate the feature with the set of target feature identifiers. For example, some embodiments may obtain a picture of a hat from a mobile computing device, detect a feature on the hat (e.g., a white pattern over black background) using a neural network configured with a set of neural network parameters, and generate a target feature identifier or other target feature parameter based on the feature. Some embodiments may then associate the feature with the target feature identifier or other target feature parameter.

As discussed elsewhere in this disclosure, a profile may store, be linked to, or otherwise be associated with a set of virtual objects. In some embodiments, the set of virtual objects associated with a profile may be obtained from a virtual objects repository, such as the virtual objects repository 253 described above. Some embodiments may access a virtual objects repository and associate a first virtual object with a specific profile. For example, some embodiments may receive a message from a mixed reality application used to display the virtual object. In some embodiments, a user may upload a second virtual object to the virtual objects repository that had not previously been stored in the virtual objects repository, where other users or entities may obtain a version of the second virtual object from the virtual objects repository. In some embodiments, the second virtual object may be generated based on a modification of a first virtual object. Such modifications may include updates to a design, color, size, mesh geometry, another mesh parameter, deformation geometry, textures, anchor point positions, or the like.

In some embodiments, a virtual objects repository may include or provide access to an online marketplace, where users or other digital entities may pay money, provide another digital asset, provide a hash value, or provide a digital service in exchange for a virtual object of the virtual objects repository. For example, a first user may upload a first virtual object to a virtual objects repository with an associated acquisition value (e.g., a price, a required digital asset, a password, or the like). A second user may then obtain the first virtual object from the virtual object repository after sending an amount equal to the associated acquisition value to the first user via an account. Once provided, a version of the custom-made virtual object may be stored in or otherwise associated with a user profile of the second user. As described elsewhere in this disclosure, the second virtual object may then be displayed using an application operating on a mobile computing device such as a headset or smartphone after a target feature associated with the first virtual object is detected.

In some embodiments, the process 400 may include operations to collect environmental information provided by a mobile computing device, as indicated by block 408. As described above, the mobile computing device may include one or more cameras to capture the visual information. Alternatively, or in addition, the mobile computing device may include or otherwise be connected to other sensor systems, such as a Lidar system, an infrared detection system, another system capable of capturing electromagnetic waves, or the like. In some embodiments, a mobile computing device may obtain environmental information via sensors or other devices connected to the mobile computing device. For example, the mobile computing device may be connected to and obtain data from a camera on a watch, a pair of glasses, an article of clothing, or the like. As an additional example, the mobile computing device may comprise a Lidar sensor, where the Lidar sensor may be attached to a wearable item such as glasses, glass frames, other eyewear, or the like. The sensor outputs of the Lidar sensor may be used to provide environmental information in the form of a three-dimensional depth map of the space surrounding the mobile computing device.

In some embodiments, a mobile computing device may provide environmental information using an optical sensor that is not a camera. For example, the mobile computing device may include a wearable pair of eyeglasses or an eyeglass frame and a Lidar sensor without a camera. The Lidar sensor may be used to produce a depth map or other environmental information and may also be used to detect a target feature. For example, the Lidar sensor may detect an optical label or other structured pattern that includes a variable-reflectivity ink that reflects a significant fraction (e.g., reflects more than 60%) of incident light having a wavelength within a first wavelength range (e.g., 800 nm-1000 nm) and absorbs or otherwise does not significantly reflect (e.g., reflects less than 10%) light having a wavelength within a second wavelength range (e.g., 380 nm-740 nm). While the above discloses the use of a Lidar sensor without the use of a camera, some embodiments may use other non-camera optical sensors such as a Radar sensor to generate a depth map or other environmental information for use by one or more operations described in this disclosure. Alternatively, or in addition, some embodiments may use other sensors such as acoustic sensors (e.g., sonar sensors) to generate a depth map or other environmental information for use by one or more operations described in this disclosure.

In some embodiments, the process 400 may include operations to determine whether a network between a networked computing resource and a mobile computing device satisfies a set of communication criteria, as indicated by block 410. Determining whether a wireless network or other network connection between a networked computing resource and a mobile computing device satisfies a set of communication criteria may include determining whether communication exists between the networked computing resource and a mobile computing device. The mobile computing device may be connected to the networked computing resource via one or more wireless communication networks. For example, the mobile computing device may be connected to the computing resource via a Wi-Fi communication network, Bluetooth communication network, cellular communication network, radio communication network, some combination thereof, or the like.

In some embodiments, the computing resource may be a centralized computing resource such as a remote server. For example, some embodiments may determine that a networked computing resource is available in response to detecting that the mobile computing device has access to an API of a cloud computing server. The cloud computing server may perform one or more operations described in this disclosure such as updating a profiles repository, providing access to a virtual objects repository, or performing a feature detection operation. In some embodiments, the resource may be accessed via a Wi-Fi network. In some embodiments, the computing resource may be an edge computing resource operating at a cellular node, where an edge computing resource may wirelessly communicate with a mobile computing device via one or more hops along a cellular network.

Some embodiments may determine that the wireless network between the computing resource and the mobile computing device satisfies the set of communication criteria based on whether a latency or bandwidth threshold is satisfied. For example, some embodiments may determine that the wireless network between the computing resource and the mobile computing device satisfies the set of communication criteria if a latency between the computing resource and the device is less than 40 milliseconds (ms) and the bandwidth is greater than 100 megabits per second (Mb/s). Some embodiments may increase computational performance of a mobile computing device by using a latency threshold or bandwidth threshold. If a determination is made that the wireless network between the computing resource and the mobile computing device satisfies the set of communication criteria, operations of the process 400 may proceed to operations described by block 420. Otherwise, operations of the process 400 may proceed to operations described for block 430.

In some embodiments, operations of the process 400 may include sending environmental information to the networked computing resource, as described by block 420. In some embodiments, the environmental information or profile data may be sent through one or more frequency intervals of a frequency spectrum. For example, a mobile computing device may send environmental information such as visual information or profile data via a millimeter wave corresponding with frequencies above 40 GHz and reaching up to 80 GHz. The mobile computing device may also send visual information or profile data in a 100 MHz wideband corresponding to frequencies between 4 GHz to 5 GHz. Some embodiments may send the visual data or profile data at frequencies between 500 MHz to 1000 MHz.

In some embodiments, a determination that the networked computing resource is available may depend on a wireless network performance metric. In cases where the wireless network performance metric switches from satisfying a threshold to not satisfying the threshold, operations of the process 400 that were being performed by the network computing resource may switch to be being performed by a mobile computing device. For example, a mobile computing device that had been operating at a millimeter wave frequency such as 44 GHz may have been capable of downloading or uploading data at a rate of 1 Gb per second, which satisfied a bandwidth threshold of 100 Mb per second. However, the mobile computing device may be moved to a location where the connection between the mobile computing device and the wirelessly connected computing resource is switched to a low-band frequency between 500 MHz to 1000 MHz. In response, operations of the process 400 may proceed to operations described by block 430.

While some embodiments may use computer vision methods to recognize target features based on visual data from cameras, computer vision methods may be used for various other environmental information obtained from other sensor devices, where the environmental information may be associated with a multi-dimensional space in a real-world environment. The computer vision methods described in this disclosure may be used for Lidar sensor outputs, Radar sensor outputs, ultrasound sensor outputs, or the like. For example, some embodiments may use a set of Lidar sensor measurements as inputs for a computer vision method trained to detect the presence of a target feature having three pyramidal protrusions or another three-dimensional feature.

In some embodiments, operations of the process 400 may include using computer vision methods to recognize a set of target features using the networked computing resource, as indicated by block 424. Various computer vision methods may be used to recognize the set of target features. In some embodiments, the use of computer vision methods may include the use of a neural network. Example neural network usable for computer vision applications may include CNNs, recurrent neural networks RNNs such as LSTM neural networks, graph neural networks (GNNs), or the like. Neural networks for computer vision may be used in a variety of specific computer vision tasks or operations. For example, some embodiments may use a deep CNN such as the ResNet-50 deep residual neural network for video object segmentation (VOS), where VOS operations may include segmenting and tracking a set of objects in a video. Some embodiments may include tracking an object as it changes location and appearance over time. For example, some embodiments may predict a relative performance difference between two frames of a video, where the relative performance may be determined based on a combination of similarity or accuracy, and where the relative performance may be used to track the object.

Some embodiments may use a neural network or other learning system to determine a shape or pose of a movable object in physical space, such as an arm, a leg, a torso, an upper body, or another portion of a human body. For example, some embodiments may use a graph CNN trained on a set of 3D meshes or other set of virtual representations and a set of 3D poses to determine a target object based on an image or video of an object. After training, the graph CNN may obtain an image as input and detect the presence of one or more target objects based on the image. Some embodiments may then compute and use parameters of the detected object to determine whether it is a target object. For example, some embodiments may analyze a surface topology of a detected object to determine that the detected object is a portion of a human hand and, in response, determine that the detected object is a target object if objects categorized as part of a human hand are target objects.

Some embodiments may also use the parameters of the detected object to generate a virtual representation of the target object. Some embodiments may use the virtual representation to select a virtual object or to determine a set of parameters of the virtual object. For example, some embodiments may detect that a virtual representation is categorized as a human head and, in response, select a virtual object model that is categorized as a model for glasses to be displayed as overlaid on a human head.

Some embodiments may use a neural network other learning system to detect a large number of objects of different categories. For example, some embodiments may detect, amongst a set of images, more than 100 object having different categories with respect to each other, more than 500 objects having different categories with respect to each other, more than 1000 object having different categories with respect to each other, or the like. Some embodiments may include the use of one or more knowledge graphs to determine multipliers, factors, or other type of decision weights when performing object recognition. For example, some embodiments may stack a framework that includes knowledge graphs on a neural network model. After detecting a feature indicated by the stacked knowledge graph, some embodiments may select or otherwise update a set of weights of the neural network, a hyperparameter of the neural network, or other parameter of the neural network to increase the predictive accuracy of the neural network.

In some embodiments, a capsule neural network may be used to recognize an object or other target feature. The capsule neural network may include a capsule between a first neural network node and a second neural network node, where the capsule may include a message set of neural layers. The output of a capsule may include a vector, where the vector may represent or otherwise be associated with a generalized set of properties such as position, size, pose, angle, deformation, texture, or the like. During training, this vector may be sent to some or all parent neural network nodes in capsule network and used to increase a capsule value by finding by increasing the connection between the capsule and the parent neural network node having the largest scaler prediction vector. The use of a capsule neural network allows a machine learning model to consider both features and spatial arrangements between features, which may increase the accuracy of object recognition operations. In some embodiments, the capsule neural network (or other machine learning model) may be pre-trained.

As discussed elsewhere in this disclosure, a target feature identifier may be used to retrieve a set of parameters for a neural network or other machine learning model, where the target feature identifier may be sent from a mobile computing device. For example, a first target feature identifier may be associated with a feature shaped like a square, and a second target feature identifier may be associated with a feature shaped like a triangle. After obtaining the first target feature identifier, some embodiments may retrieve a first set of neural network parameters for use with a first neural network (e.g., a capsule neural network) based on the first target feature identifier. Some embodiments may use the first neural network to detect or otherwise determine the position(s) of a version of the first target feature in a first set of images, such as determining the positions of a set of squares in a video file. Additionally, after obtaining a second target feature identifier, some embodiments may retrieve a second set of neural network parameters for use by the first neural network based on the second target feature identifier. Some embodiments may then use the first neural network to detect and determine the positions of a second target feature in the same set of images or a different set of images. For example, some embodiments may use the first neural network after updating it with the second set of neural network parameters to detect the positions of a set of triangles in the first video file or a second video file, where the second video file may include images of a same physical object as shown in the first video file.

In some embodiments, a target feature identifier may be stored in a networked computing resource. For example, some embodiments may obtain profile data from a mobile computing device, where the profile data may be used to by a networked computing resource to retrieve a set of the target feature identifiers or other target feature parameters based on the profile data. Alternatively, while the above discusses using an identifier to retrieve feature parameters usable to identify a target feature in visual information, some embodiments may send feature parameters directly from a mobile computing device. In some embodiments, a target feature identifier may be stored in a user profile or may be otherwise associated with a user profile identifier.

in some embodiments, operations of the process 400 may include determining a set of anchor points or a set of virtual objects based on the set of target features and sending the associated data to the mobile computing device, as indicated by block 428. In some embodiments, the position of a target feature with respect to the features of the rest of an image may be the same as the position of the anchor point with respect to the features of the image. For example, if the position of a target feature is represented by the coordinates [53, 79, 422], some embodiments may set the position of an anchor point at the coordinates [53, 79, 422]. Alternatively, or in addition, an anchor point may be set at a location based on a set of locations of the set of target features. For example, the anchor point may be set as the midpoint of five target features in an image.

In some embodiments, the position of an anchor point may be independent of the position of a target feature. For example, some embodiments may detect the presence of a target feature based on a target feature identifier and determine a virtual representation of a physical object that the target feature is positioned upon. Some embodiments may then position a first anchor point at a calculated centroid of the virtual representation and a second anchor point at an edge of the virtual representation.

In some embodiments, the set of virtual objects may be determined by default. For example, an application may include instructions to load a 3D model of a human hand in response to the recognition of a target feature representing a human hand. Alternatively, or in addition, a virtual object may be selected based on a set of attributes of a target feature, the number of target features, profile data, user input data, some combination thereof, or the like. For example, some embodiments may recognize an identifier after analyzing a target feature. Some embodiments may then use identifier to obtain profile data from a mobile computing device, cloud server, or other computing device and select a virtual object type from a group of virtual object types, such as a group of more than 1,000 object types, more than 10,000 virtual object types, or the like.

In some embodiments, different target features may be identified and may trigger a computing system to determine respectively different virtual objects. For example, some embodiments may detect a first target feature indicating a first design and a second target feature indicating a second design. Some embodiments may then select a first virtual object in response to the detection of the first target feature and select a second virtual object in response to the detection of the second target feature. Additionally, in some embodiments, a virtual representation may be used to determine model parameters of the selected virtual object such as a length, width, height, volume, color, gradient, curvature, visual effect, text, or the like. For example, some embodiments may use an identifier of a user profile to select a 3D model in the shape of a rhinoceros horn. Some embodiments may determine the size of the rhinoceros horn based on a virtual representation that is categorized as a hat, such as be determining the size of the rhinoceros horn to be equal to the height of the hat multiplied by a constant.

Some embodiments may determine a virtual object for display based on a combination of a user profile and a detected target feature. For example, after recognizing a set of target features, such as a QR code or other visual encoding, some embodiments may use a computing device to determine a user profile associated with the set of target features. In some embodiments, the computing device may send a request to a server to cause the server to perform a lookup operation to determine a set of virtual objects associated with a user profile. For example, some embodiments may send a universal resource identifier (URI) request to a user profile repository that is linked to a virtual objects repository to retrieve a virtual object model from the repository.

In some embodiments, a virtual object may be based on a specific user profile and on the position of the anchor point. For example, after a second user selects, via graphical user interface, a first virtual object uploaded by a first user, some embodiments may store the first virtual object in the second user's profile or otherwise associate the first virtual object in the second user's profile. A computing device may then detect a target feature associated with the second user's profile on an article of clothing or body part and, in response, send a request to a user profile repository to obtain a virtual object associated with the second user's profile. The computing device may then load the virtual object into the memory of the computing device and display the virtual object at its corresponding anchor point. For example, some embodiments may detect a visual encoding of a object identifier on a shirt, send the identifier and profile data in a request to a server, obtain a mesh model of a virtual shirt or a set of mesh parameters associated with the virtual shirt, and display a version of the virtual shirt anchored to a position of the visual encoding. Some embodiments may select the mesh model based on a value indicating that the visual encoding is positioned in a shirt in physical space.

In some embodiments, a virtual object may be generated, selected, or otherwise determined based on the target feature. For example, some embodiments may obtain an image of a feature and, in response, generate a 3D projection of a sequence of text such as 3D block letters stating the words "For Demonstration Purposes at 3 PM Only." By linking the display of a 3D object to a target feature, various forms of AR interactivity may be arranged in a physical environment without changing software elements. In some embodiments, the virtual object may also be generated based on data obtained from a third-party system, such as via a web API. For example, the virtual object may include nutrition data from a government database, product reviews from a review website, or the like.

Ad disclosed elsewhere in this disclosure, some embodiments may store different profile data associated with different devices or users, where receiving different profile data may cause different virtual objects to be determined. For example, after the detection of a target feature, a mobile computing device may obtain a first set of profile data associated with a first user. Some embodiments may then select a virtual object, such as a model of a rhinoceros horn, instead of other virtual object models when generating, modifying, or otherwise updating a virtual object.

In some embodiments, operations of the process 400 may include using computer vision methods to recognize the set of target features based on a set of target feature parameters using computing resources of the mobile computing device, as indicated by block 430. Operations to recognize the set of target features may include operations similar to those of block 424. Furthermore, some embodiments may perform one or more operations similar to those described for block 424 using the hardware of a mobile computing device without requiring communication with a second computing device. For example, some embodiments may use a local version of a trained CNN operating on a first computing device to detect a set of features, categorize an object detected from the set of features as a targeted object, or generate a virtual representation of the object without communicating with a second computing device. In some embodiments, a local version of a neural network stored in a persistent storage of a mobile computing device may be different a remote version of the neural network stored in a remote computing device, such as a cloud server. The local version of the neural network may have different weights, biases, or other parameters, and may require less computing resources to operate compared to the remote version of the neural network.

In some embodiments, computing resources of the mobile computing device may include the use of a mixed reality software platform. The computing resources of the mobile computing device may include or otherwise use specialized mixed reality hardware, such as hardware vector accelerators, hardware tensor accelerators, application-specific integrated circuits for computer vision, or the like. In some embodiments, mixed reality hardware may include support for multiple, simultaneous camera feeds (e.g., more than three cameras, more than four cameras, more than six cameras, or the like). In some embodiments, mixed-reality hardware may include support for other sensor types, such as Lidar sensors, Radar sensors, ultrasound sensors, or the like. For example, mixed-reality hardware may include support for a device comprising a Lidar sensor to recognize a set of target features.

In some embodiments, the process 400 may include determining a set of anchor points or set of virtual objects based on the set of target features using the computing resources of the mobile computing device, as described by block 438. In some embodiments, operations to determine the anchors for the virtual object may be similar to those described for block 428. Alternatively, some embodiments may use parameters or algorithms that require fewer computational resources than those used by a cloud server executing one or more operations described by this disclosure. Some embodiments may be configured to use a longer draw distance when a networked computing resource is available in comparison to when the networked computing resource is not available. For example, some embodiments may display virtual object with a draw distance of 1000 meters when using a networked computing resource and generate a virtual object with a draw distance of 100 meters when only using the computing resources of a mobile computing device. Alternatively, or in addition, a confidence threshold or other metric correlated with prediction accuracy may be reduced when using the computing resource use is switched from a networked computing resource to a mobile computing device.

In some embodiments, operations of the process 400 may include displaying the set of virtual objects based on the set of anchor points of the mobile computing device, as indicated by block 460. In some embodiments, displaying the set of virtual objects based on the anchors may include positioning the anchors at one or more points with respect to an obtained image or video. In some embodiments, the set of target features may first be tracked, where the tracking may be based on the target feature or a simplified representation (e.g., vector form, reduced pixel count, or the like) of the target feature.

Some embodiments may simplify tracking of the target feature by reducing the dimensionality or reducing the data associated with the target feature. For example, after determining that a QR code appearing on a handbag is a target feature, some embodiments may down sample an image or otherwise reduce the resolution of the image such that a representation of the reduced resolution QR code appears as a grayscale block that can be contrasted against his surroundings. The position of the grayscale block may then be used as an anchor point, where the anchor point may then be used to display the virtual object.

In some embodiments, a virtual object may be displayed on a flat or curved screen of the mobile computing device. For example, the virtual object may be displayed on a liquid crystal display (LCD), light-emitting diode (LED) display, organic LED (OLED) display, active-matrix OLED (AMOLED) display, or the like. In some embodiments, the virtual object may be displayed on an augmented reality headset, pair of mixed reality smart glasses, or the like. For example, the virtual object may be displayed on a transparent surface or partially transparent surface, such as a material layer in the lenses of a pair of glasses, where a projector may project a version of the virtual object. As discussed in this disclosure, the environmental information and detected target features may be used to determine the properties (e.g., position, orientation, color, shading, or the like) of the virtual objects being projected by the projector.

In some embodiments, operations of the process 400 may include transmitting a message from the mobile computing device based on the set of virtual objects, as indicated by block 470. In some embodiments, interactions captured by the mobile computing device indicating user attempts to interact with a virtual object may cause the mobile computing device to send a message that updates one or more values stored in a remote server. For example, a user may be able to view a size of a virtual hat, modify the size of the virtual hat by performing a sequence of hand gestures, and indicate that the hat size is finalized of the mobile computing device. The mobile computing device may then transmit a value representing the updated hat size to a remote server, which may then be retrieved during later operations. As another example, some embodiments may determine an identifier from a feature, access a repository based on the identifier, and obtain a message indicating that the physical object displaying the feature is stolen or otherwise improperly registered. In response, some embodiments may generate a virtual object indicating that the physical object is stolen or otherwise improperly registered.

Figure 5:
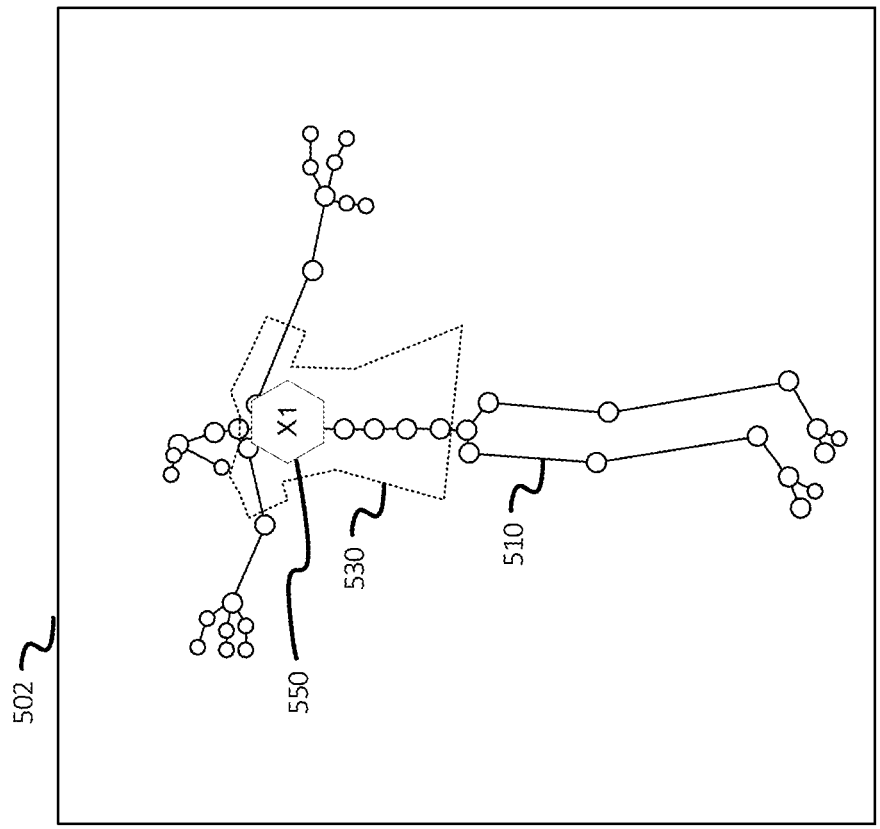
FIG. 5 illustrates an example operation to display a virtual object, in accordance with some embodiments of the present techniques.
Figure 5:
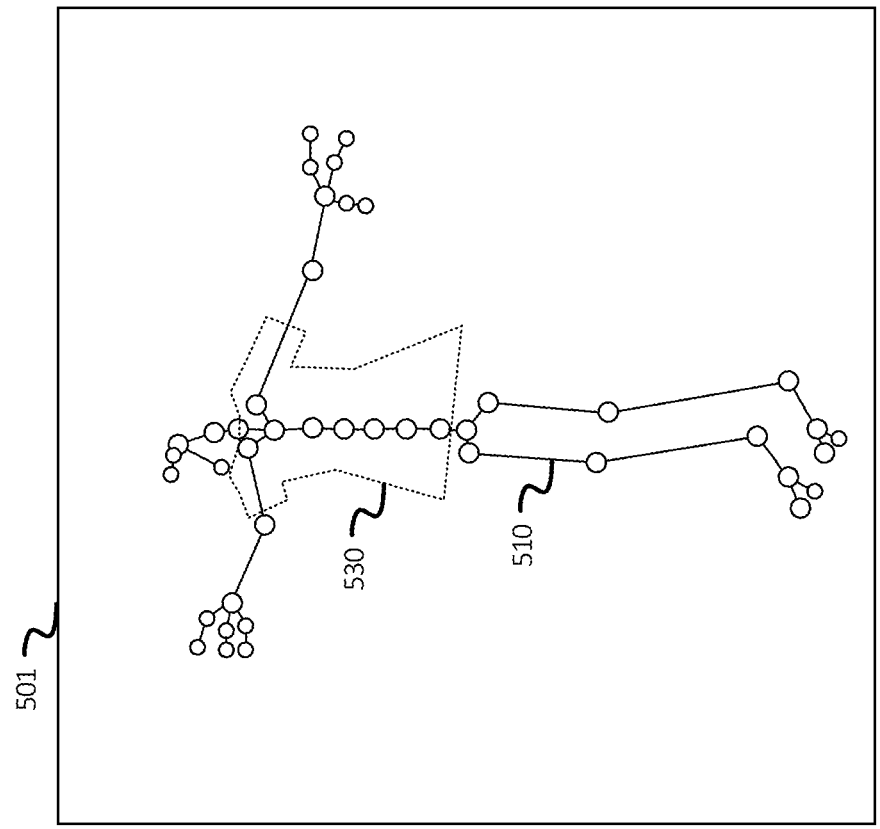

FIG. 5 illustrates an example operation to display a virtual object, in accordance with some embodiments of the present techniques; and The box 501 depicts a first virtual representation 510 and a second virtual representation 530. The first virtual representation 510 may be depicted a rigged mesh and represents a physical human body. The second virtual representation 530 may be depicted as a rigged mesh (un-pictured) that represents a physical article of clothing fitting over the physical human body and may be determined to be a target physical object.

The box 502 depicts the first virtual representation 510 and second virtual representation 530. Some embodiments may implement at least a portion of the process 300 or process 400 as described above to attach the virtual object 550 to the second virtual representation 530, where the virtual object 550 includes a hexagon at the text "X1." As described above, some embodiments may display the virtual object 550 with the second virtual representation 530. In some embodiments, the virtual object 550 may be generated as having the same texture as the second virtual representation 530. For example, some embodiments may analyze an image of the second virtual representation 530 to detect a 'cloth' texture, where a 'cloth' texture may be characterized with a first visual pattern simulating fabric threading and wrinkling. Some embodiments may then generate the virtual object 550 with the first visual pattern using UV texture mapping, where the virtual object 550 displays a hexagon having a visual texture determined using the first visual pattern.

Some embodiments may display the virtual object 550 without displaying the second virtual representation 530. For example, some embodiments may display the virtual object 550 without altering the appearance of the shirt used to generate the second virtual representation 530. Alternatively, or in addition, some embodiments may display the virtual object 550 concurrently with the second virtual representation 530.

Figure 6:
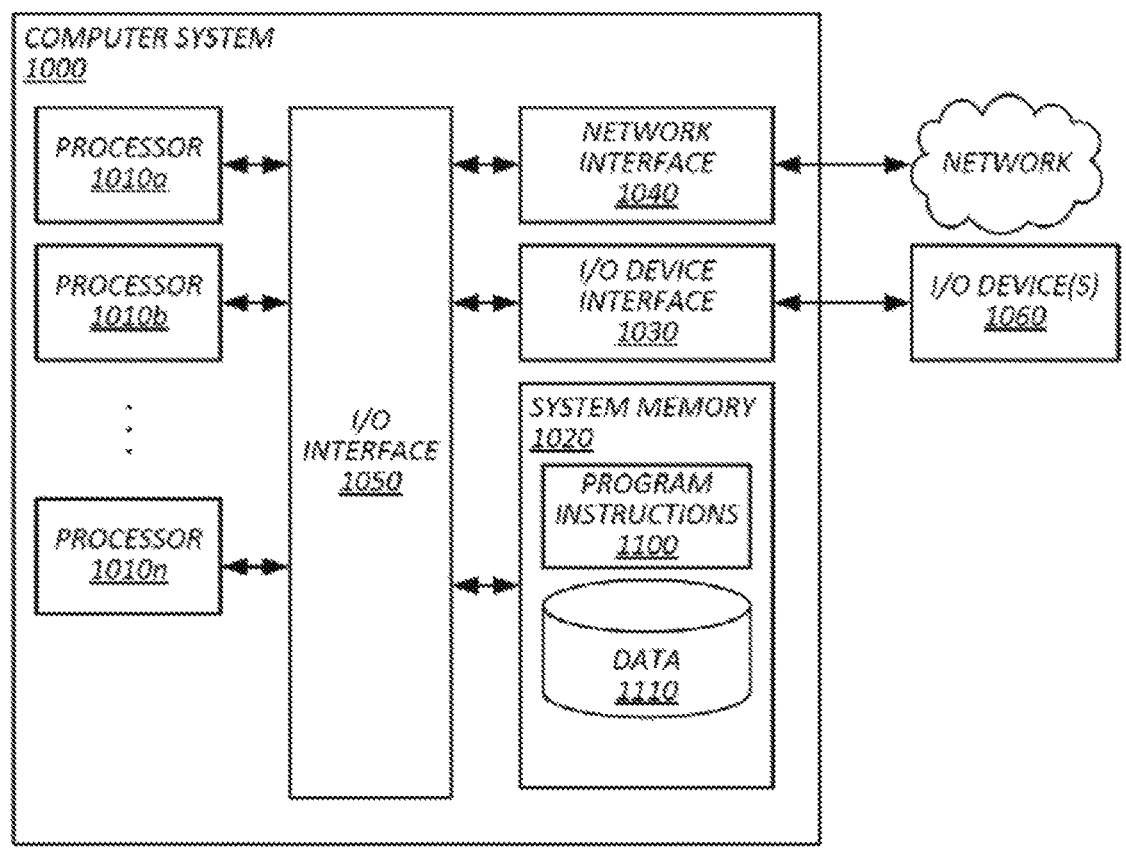
FIG. 6 shows an example of a computing device by which the present techniques may be implemented.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a GPS, or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. Furthermore, the term "mixed reality" as used in this disclosure is generic to either virtual reality (VR) technology or augmented reality (AR) technology.

In this patent, to the extent certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine readable medium storing instructions that, when executed by one or more processors, execute operations comprising: obtaining, with a computing device, a profile of a user; obtaining, with the computing device, a set of images via a camera of the computing device; inputting, with the computing device, into a convolutional neural network executing on the computing device, the set of images; detecting, with the convolutional neural network executing on the computing device, a target physical object depicted in the set of images; determining, with the computing device, a contour of the target physical object in pixel coordinates of the set of images; determining, with the computing device, a first three-dimensional reconstruction in world-space coordinates of the target physical object based on the set of images and the contour; generating, with the computing device, a virtual representation based on the first three-dimensional reconstruction; generating, with the computing device, a virtual object based on a set of attributes of the virtual representation and the profile of the user, wherein a first attribute of the set of attributes comprises the first three-dimensional reconstruction; associating, with the computing device, the virtual object with the virtual representation, wherein a position of the virtual object is computed based on the contour of the target physical object; and displaying, with the computing device, the virtual object at pixel coordinates of a display that at least partially occlude at least part of the target physical object from a perspective of the user.

2. The medium of embodiment 1, the operations further comprising: detecting a first physical object based on the set of images, wherein the set of images comprise images of the first physical object associated with different measurement times and different camera poses; determining a set of features of the first physical object based on the set of images; tracking the set of features of the set of images over time to determine a trajectory of the set of features; determining a transformed shape of the first physical object based on the trajectory; determining that the first physical object is the target physical object based on the transformed shape.
3. The medium of any of embodiments 1 to 2, wherein the convolutional neural network is a first deep convolutional neural network, and wherein the set of images is a first set of images, the operations further comprising: obtaining a message indicating that a second version of the target physical object is within a geographic range; and obtaining a second set of images; obtaining a second neural network result of a second neural network that uses the set of images as an input, wherein parameters of the second neural network is differs from parameters of the first deep convolutional neural network; detecting, with the computing device, the second version of the target physical object based on the second neural network result and on the second version of the target physical object; and displaying, with the computing device, a second version of the virtual object, wherein the second version of the virtual object is attached to the second version of the target physical object.
4. The medium of any of embodiments 1 to 3, the operations further comprising: determining a set of features of the target physical object based on the set of images; generating a set of virtual representation boundaries based on the set of features; and determining an anchor point based on the set of virtual representation boundaries, wherein displaying the virtual object comprises attaching a point of the virtual object to the anchor point.
5. The medium of any of embodiments 1 to 4, the operations further comprising: detecting a first physical object based on the set of images; obtaining a mesh representing a portion of a body; associating the first physical object with the mesh; determining a set of measurements for the detected physical object based on the set of images; determining a set of mesh parameters based on the set of measurements; updating the mesh based on the set of mesh parameters; and updating a shape of the virtual object based on the mesh.
6. The medium of any of embodiments 1 to 5, wherein: generating the virtual representation comprises generating a shape of the virtual representation based on the contour of the target physical object; and wherein associating the virtual object with the virtual representation comprises determining a virtual position of the virtual object with respect to a first point of the contour of the target physical object; and wherein displaying the virtual object comprises occluding a portion of the virtual object encompassing the virtual position based on an orientation of the virtual position with respect to the first point.
7. The medium of any of embodiments 1 to 6, wherein displaying the virtual object comprises displaying the virtual object concurrently with the virtual representation.
8. The medium of any of embodiments 1 to 7, wherein obtaining the set of images comprises: obtaining a set light detection and ranging (Lidar) measurements using a Lidar sensor; generating a point cloud based on the set of Lidar measurements; and determining a dimension of the target physical object based on the point cloud.
9. The medium of any of embodiments 1 to 8, the operations further comprising reducing an image resolution of the set of images.
10. The medium of any of embodiments 1 to 9, the operations further comprising: detecting a target feature of the target physical object based on the set of images and a set of target feature parameters, and wherein: generating the virtual object comprises: selecting a version of the virtual object from a virtual object repository based the target feature; updating the version of the virtual object based on the first three-dimensional reconstruction; and determining an anchor point for the virtual object based on the target feature; and displaying the virtual object comprises positioning a point of the virtual object with respect to the anchor point.
11. The medium of embodiment 10, wherein detecting the target feature is performed with a microprocessor different from a central processing unit of the computing device, the microprocessor having a 16 or fewer bit architecture and being configured to operate on data in a floating radix point format.
12. The medium of any of embodiments 10 to 11, wherein determining the virtual object comprises determining the virtual object based on the profile of the user.
13. The medium of any of embodiments 1 to 12, the operations further comprising: determining whether a wireless network between a computing resource and a mobile computing device satisfies a set of communication criteria, wherein the computing resource stores a version of the convolutional neural network; obtaining the set of images at the computing resource via the wireless network in response to a determination that the wireless network between the computing resource and that the mobile computing device satisfies the set of communication criteria, wherein inputting the set of images comprises inputting the set of images into the version of the convolutional neural network stored in the computing resource.
14. The medium of any of embodiments 1 to 13, the operations further comprising: determining whether a wireless network between a computing resource and a mobile computing device satisfies a set of communication criteria, wherein the computing resource stores a version of the neural network; and wherein inputting the set of images into the convolutional neural network comprises inputting the set of images into a local version of the convolutional neural network stored in a persistent storage of the computing device in response to a determination that the wireless network between the computing resource and that the mobile computing device does not satisfy the set of communication criteria.
15. The medium of any of embodiments 1 to 14, the operations further comprising: determining a resource identifier based on the target physical object; determining whether a wireless network between a computing resource and a mobile computing device satisfies a set of communication criteria, wherein the computing resource stores a version of the neural network; and obtaining a version of the virtual object via a wireless connection using the resource identifier in response to a determination that the wireless network between the computing resource and the mobile computing device satisfies the set of communication criteria.
16. The medium of any of embodiments 1 to 15, the operations further comprising: obtaining a set of neural network parameters via a wireless connection; and updating the convolutional neural network with the set of neural network parameters.

17. The medium of any of embodiments 1 to 16, the operations further comprising: obtaining an update to a record associated with a feature of the target physical object; and updating a display of the virtual object based on the update.

18. The medium of any of embodiments 1 to 17, further comprising detecting a feature of the target physical object based on signals from an optical sensor detecting light reflecting from a structured pattern having a wavelength greater than 800 nanometers.

19. The medium of any of embodiments 1 to 18, further comprising steps for generating the virtual object.

20. A method, comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A non-transitory, machine readable medium storing instructions that, when executed by one or more processors, execute operations comprising:
    obtaining, with a computing system, access to a profile of a user;
    obtaining, with the computing system, a set of images via a camera of the computing system;
    detecting, with a trained object-detection computer-vision model executing on the computing system, a target physical object depicted in the set of images, the target physical object having a machine-readable optical label detected by the trained object-detection computer-vision model;
    parsing, with the computing system, an identifier encoded by the machine-readable optical label and selecting, based on the identifier and the profile of the user, a virtual object from among a plurality of virtual objects in a virtual object repository;
    determining, with the computing system, a contour of the target physical object in pixel coordinates of the set of images;
    determining, with the computing system, a first three-dimensional reconstruction in world-space coordinates of the target physical object based on the set of images and the contour;
    generating, with the computing system, a virtual representation of the target physical object based on the first three-dimensional reconstruction;
    generating, with the computing system, a representation of the virtual object based the first three-dimensional reconstruction;
    associating, with the computing system, the representation of the virtual object with the virtual representation of the target physical object, wherein a position of the representation of the virtual object is computed based on the contour of the target physical object; and
    displaying, with the computing system, the representation of the virtual object at pixel coordinates of a display that at least partially occlude at least part of the target physical object from a perspective of the user.

2. The medium of claim 1, the operations further comprising:
    detecting a first physical object based on the set of images, wherein the set of images comprise images of the first physical object associated with different measurement times and different camera poses;
    determining a set of features of the first physical object based on the set of images;
    tracking the set of features of the set of images over time to determine a trajectory of the set of features;
    determining a transformed shape of the first physical object based on the trajectory;
    determining that the first physical object is the target physical object based on the transformed shape.

3. The medium of claim 1, wherein the trained object-detection computer-vision model comprises a convolutional neural network that is a first deep convolutional neural network, and wherein the set of images is a first set of images, the operations further comprising:
    obtaining a message indicating that a second version of the target physical object is within a geographic range; and
    obtaining a second set of images;
    obtaining a second neural network result of a second neural network that uses the second set of images as an input, wherein parameters of the second neural network differ from parameters of the first deep convolutional neural network;
    detecting the second version of the target physical object based on the second neural network result; and
    displaying a second representation of the virtual object, wherein the second representation of the virtual object is attached to the second version of the target physical object.

4. The medium of claim 1, the operations further comprising:
    determining a set of features of the target physical object based on the set of images;
    generating a set of virtual representation boundaries based on the set of features; and
    determining an anchor point based on the set of virtual representation boundaries, wherein displaying the representation of the virtual object comprises attaching a point of the representation of the virtual object to the anchor point.

5. The medium of claim 1, the operations further comprising:
    detecting a first physical object based on the set of images;
    obtaining a mesh representing a portion of a body;
    associating the first physical object with the mesh;
    determining a set of measurements for the detected physical object based on the set of images;
    determining a set of mesh parameters based on the set of measurements;
    updating the mesh based on the set of mesh parameters; and
    updating a shape of the representation of the virtual object based on the mesh.

6. The medium of claim 1, wherein:
    generating the virtual representation of the target physical object comprises generating a shape of the virtual representation of the target physical object based on the contour of the target physical object; and
    wherein associating the representation of the virtual object with the virtual representation of the target physical object comprises determining a virtual position of the virtual object with respect to a first point of the contour of the target physical object; and
    wherein displaying the representation of the virtual object comprises occluding a portion of the virtual object encompassing the virtual position based on an orientation of the virtual position with respect to the first point.

7. The medium of claim 1, wherein displaying the representation of the virtual object comprises displaying the representation of the virtual object concurrently with the virtual representation of the target physical object.

8. The medium of claim 1, wherein obtaining the set of images comprises:
obtaining a set of light detection and ranging (Lidar) measurements using a Lidar sensor;
generating a point cloud based on the set of Lidar measurements; and
determining a dimension of the target physical object based on the point cloud.

9. The medium of claim 1, the operations further comprising:
detecting a target feature of the target physical object based on the set of images and a set of target feature parameters, and wherein:
generating the representation of the virtual object comprises:
updating the version of the virtual object based on the first three-dimensional reconstruction; and
determining an anchor point for the virtual object based on the target feature; and
displaying the representation of the virtual object comprises positioning a point of the representation of the virtual object with respect to the anchor point.

10. The medium of claim 9, wherein the computing system is a computing device and detecting target physical object is performed with a microprocessor different from a central processing unit of the computing device, the microprocessor having a 16 or fewer bit architecture and being configured to operate on data in a floating radix point format.

11. The medium of claim 9, wherein selecting the virtual object comprises determining the virtual object based on the profile of the user, and the machine-readable optical label comprises a QR code.

12. The medium of claim 1, wherein the computing system comprises a mobile computing device and a computing resource, the operations further comprising:
determining whether a wireless network between the computing resource and the mobile computing device satisfies a set of communication criteria, wherein the computing resource stores a version of the trained object-detection computer-vision model; and
obtaining the set of images at the computing resource via the wireless network in response to a determination that the wireless network between the computing resource and that the mobile computing device satisfies the set of communication criteria, wherein inputting the set of images comprises inputting the set of images into the version of the trained object-detection computer-vision model stored in the computing resource.

13. The medium of claim 1, wherein the computing system comprises a mobile computing device and a computing resource, the operations further comprising:
determining whether a wireless network between the computing resource and the mobile computing device satisfies a set of communication criteria, wherein the computing resource stores a version of the trained object-detection computer-vision model; and
wherein inputting the set of images into the trained object-detection computer-vision model comprises inputting the set of images into a local version of the trained object-detection computer-vision model stored in a persistent storage of the computing device in response to a determination that the wireless network between the computing resource and that the mobile computing device does not satisfy the set of communication criteria.

14. The medium of claim 1, wherein the computing system comprises a mobile computing device and a computing resource, the operations further comprising:
determining a resource identifier based on the target physical object;
determining whether a wireless network between the computing resource and the mobile computing device satisfies a set of communication criteria, wherein the computing resource stores a version of the trained object-detection computer-vision model; and
obtaining a version of the virtual object via a wireless connection using the resource identifier in response to a determination that the wireless network between the computing resource and the mobile computing device satisfies the set of communication criteria.

15. The medium of claim 1, the operations further comprising detecting a feature of the target physical object based on signals from an optical sensor detecting light reflecting from a structured pattern having a wavelength greater than 800 nanometers.

16. The medium of claim 1, the operations further comprising steps for generating the virtual object.

17. The medium of claim 1, wherein:
the trained object-detection computer-vision model comprises a convolutional neural network that is a first deep convolutional neural network, and wherein the set of images is a first set of images, the operations further comprising:
obtaining a message indicating that a second version of the target physical object is within a geographic range; and
obtaining a second set of images;
obtaining a second neural network result of a second neural network that uses the second set of images as an input, wherein parameters of the second neural network differ from parameters of the first deep convolutional neural network;
detecting, with the computing system, the second version of the target physical object based on the second neural network result; and
displaying, with the computing system, a second representation of the virtual object, wherein the second representation of the virtual object is attached to the second version of the target physical object;
detecting the target physical object is performed with a microprocessor different from a central processing unit of the computing system, the microprocessor having a 16 or fewer bit architecture and being configured to operate on data in a floating radix point format;
the computing system comprises a mobile computing device and a computing resource; and
the operations further comprise:
determining a resource identifier based on the target physical object;
determining whether a wireless network between the computing resource and the mobile computing device satisfies a set of communication criteria, wherein the computing resource stores a version of the neural network; and
obtaining a version of the virtual object via a wireless connection using the resource identifier in response to a determination that the wireless network between the computing resource and the mobile computing device satisfies the set of communication criteria.

18. The medium of claim 1, wherein:
the computing system is a mobile-computing device;
the machine-readable optical label comprises a QR code;
the identifier distinguishes the selected virtual object from other virtual objects in the virtual object repository;
detecting the machine-readable optical label is performed with a depth-separable convolutional neural network executed by a computer-vision hardware accelerator of the mobile-computing device;
the representation of the virtual object is anchored in an augmented reality display by a feature of the machine-readable optical label on the article of clothing; and
the identifier is unique to the article of clothing.

19. The medium of claim 1, the operations comprising:
steps for associating the virtual object with the physical object.

20. The medium of claim 1, wherein:
the virtual object repository or the user profile indicates the virtual object is owned by the user; and
the person acquired the virtual object from another person who formerly owned the virtual object.

21. The medium of claim 1, wherein:
the trained object-detection computer-vision model comprises a convolutional neural network that is a first deep convolutional neural network, and wherein the set of images is a first set of images, the operations further comprising:
obtaining a message indicating that a second version of the target physical object is within a geographic range; and
obtaining a second set of images;
obtaining a second neural network result of a second neural network that uses the second set of images as an input, wherein parameters of the second neural network differ from parameters of the first deep convolutional neural network;
detecting, with the computing system, the second version of the target physical object based on the second neural network result; and
displaying, with the computing system, a second representation of the virtual object, wherein the second representation of the virtual object is attached to the second version of the target physical object;

detecting the target physical object is performed with a microprocessor different from a central processing unit of the computing system, the microprocessor having a 16 or fewer bit architecture and being configured to operate on data in a floating radix point format.

22. A method comprising:
obtaining, with a computing system, access to a profile of a user;
obtaining, with the computing system, a set of images via a camera of the computing system;
detecting, with a trained object-detection computer-vision model executing on the computing system, a target physical object depicted in the set of images, the target physical object having a machine-readable optical label detected by the trained object-detection computer-vision model;
parsing an identifier encoded by the machine-readable optical label and selecting, based on the identifier and the profile of the user, a virtual object from among a plurality of virtual objects in a virtual object repository;
determining, with the computing system, a contour of the target physical object in pixel coordinates of the set of images;
determining, with the computing system, a first three-dimensional reconstruction in world-space coordinates of the target physical object based on the set of images and the contour;
generating, with the computing system, a virtual representation of the target physical object based on the first three-dimensional reconstruction;
generating, with the computing system, a representation of the virtual object based first three-dimensional reconstruction;
associating, with the computing system, the representation of the virtual object with the virtual representation of the target physical object, wherein a position of the representation of the virtual object is computed based on the contour of the target physical object; and
displaying, with the computing system, the representation of the virtual object at pixel coordinates of a display that at least partially occlude at least part of the target physical object from a perspective of the user.

* * * * *